US012797906B2

(12) United States Patent
Peresan et al.

(10) Patent No.: US 12,797,906 B2
(45) Date of Patent: Nov. 17, 2026

(54) APPARATUSES, METHODS, AND SYSTEMS FOR VIBRATORY SCREENING

(71) Applicant: Derrick Corporation, Buffalo, NY (US)

(72) Inventors: Michael Peresan, Strykersville, NY (US); Jonathan Berent, Lancaster, NY (US)

(73) Assignee: Derrick Corporation, Buffalo, NY (US)

( * ) Notice: Subject to any disclaimer, the term of this patent is extended or adjusted under 35 U.S.C. 154(b) by 0 days.

(21) Appl. No.: 19/341,625

(22) Filed: Sep. 26, 2025

(65) Prior Publication Data

US 2026/0183798 A1 Jul. 2, 2026

Related U.S. Application Data

(60) Provisional application No. 63/700,041, filed on Sep. 27, 2024.

(51) Int. Cl.
*B07B 1/46* (2006.01)
*B07B 1/28* (2006.01)

(52) U.S. Cl.
CPC .............. *B07B 1/4645* (2013.01); *B07B 1/28* (2013.01); *B07B 2201/04* (2013.01); *B07B 2230/04* (2013.01)

(58) Field of Classification Search
CPC ............................ B07B 1/4609; B07B 1/4618
USPC .......................................... 209/405, 411, 412
See application file for complete search history.

(56) References Cited

U.S. PATENT DOCUMENTS

| | | | |
|---|---|---|---|
| 3,042,206 | A | 7/1962 | Olender |
| 4,265,742 | A | 5/1981 | Buecker et al. |
| 4,486,302 | A | 12/1984 | Jorgensen |
| 4,661,245 | A | 4/1987 | Rutherford |
| 5,248,043 | A | 9/1993 | Dorn |
| 5,377,846 | A | 1/1995 | Askew |
| 6,260,711 | B1 | 7/2001 | Woodgate |
| 6,267,246 | B1 | 7/2001 | Russell et al. |

(Continued)

FOREIGN PATENT DOCUMENTS

| | | |
|---|---|---|
| EP | 0081471 | 6/1983 |
| EP | 0296273 | 12/1988 |

(Continued)

*Primary Examiner* — Molly K Devine
(74) *Attorney, Agent, or Firm* — FisherBroyles, LLP; Jason P. Mueller

(57) ABSTRACT

A screen deck configured to receive a screen assembly includes side mounting assemblies that are configured to removably couple to side edges of a screen assembly. The side mounting assemblies can include one or more upwardly extending projections. A screen assembly configured to be mounted to the screen deck includes side edges that include one or more recesses that are configured to receive the upwardly extending projections of the side mounting assemblies on the screen deck. When the screen assembly is removably mounted on the screen deck, a top portion of the upwardly extending projections on the side mounting assemblies of the screen deck are located above a top surface of a screening surface of the screen assembly. The side mounting assemblies on the screen deck may also include one or more inwardly extending projections that are received in corresponding recesses on sides of the screen assembly.

31 Claims, 22 Drawing Sheets

(56) References Cited

U.S. PATENT DOCUMENTS

| | | | |
|---|---|---|---|
| 6,715,613 B2 | 4/2004 | Eeles et al. | |
| 6,957,741 B2 | 10/2005 | Freissle | |
| 7,063,214 B2 | 6/2006 | Schulte, Jr. et al. | |
| 7,654,395 B2 | 2/2010 | Johnson et al. | |
| 7,841,476 B2 | 11/2010 | Johnson | |
| 7,850,011 B2 * | 12/2010 | Fisher | B07B 1/48 209/403 |
| 8,281,934 B1 | 10/2012 | Connolly et al. | |
| 8,387,802 B2 * | 3/2013 | Barrett | B07B 1/4609 209/403 |
| 8,430,248 B2 | 4/2013 | Malmberg | |
| 8,469,199 B2 | 6/2013 | Groenvall | |
| 8,622,219 B2 | 1/2014 | Malmberg | |
| 8,887,922 B2 | 11/2014 | Lilly | |
| 9,308,555 B2 | 4/2016 | Yaver | |
| 9,327,318 B2 | 5/2016 | Paul et al. | |
| 9,610,614 B2 | 4/2017 | Woodgate et al. | |
| 9,827,597 B2 | 11/2017 | Woodgate | |
| 10,315,226 B2 | 6/2019 | Freissle | |
| 10,399,124 B2 | 9/2019 | Colgrove | |
| 2004/0007508 A1 * | 1/2004 | Schulte, Jr. | B07B 1/48 209/403 |
| 2004/0195155 A1 | 10/2004 | Mooney | |
| 2005/0189265 A1 | 9/2005 | Malmberg | |
| 2006/0196813 A1 | 9/2006 | Kadel | |
| 2015/0283583 A1 | 10/2015 | Woodgate et al. | |
| 2017/0087594 A1 | 3/2017 | Woodgate | |
| 2017/0209901 A1 | 7/2017 | Quinn | |
| 2017/0297061 A1 | 10/2017 | Ellehuus | |
| 2020/0246833 A1 * | 8/2020 | Wojciechowski | B01D 29/012 |
| 2021/0140251 A1 | 5/2021 | Walker | |
| 2024/0238845 A1 | 7/2024 | Newman | |

FOREIGN PATENT DOCUMENTS

| | | |
|---|---|---|
| KR | 200441646 | 9/2008 |
| KR | 101181901 | 9/2012 |
| WO | 2019238286 | 12/2019 |

* cited by examiner

APPARATUSES, METHODS, AND SYSTEMS FOR VIBRATORY SCREENING

This application claims priority to the Sep. 27, 2024 filing date of U.S. Provisional Patent Application No. 63/700,041, the contents of which are incorporated herein by reference.

BACKGROUND

The present application relates to a screen deck and a screen assembly configured to be removably mounted to the screen deck. The screen deck can be part of a screening machine such as a vibratory screening machine like the one disclosed in U.S. Pat. No. 11,185,801, the contents of which are incorporated herein by reference.

Existing screen decks are configured such that a screen assembly can be removably mounted to the screen deck, making it easy to replace the screen assembly if it becomes damaged or worn. In some screen decks, a mounting mechanism located on the front and rear edges of the screen deck removably couple a screen assembly to the screen deck. The mounting mechanism can include a tensioning mechanism that is configured to secure the screen assembly to the screen deck and also to selectively tension the screen assembly.

Once a screen assembly is mounted on a screen deck, material to be screened is placed on a top surface of a screening area of the screen assembly. Liquid and small sized materials fall through screening apertures in the screening area and are collected from beneath the screen assembly by an undersized material collection system. Larger particles of material that cannot pass through the screening apertures of the screen assembly travel across the top surface of the screen assembly and fall off a front or rear edge of the screen assembly. Larger sized materials falling off the front or rear edges of the screen assembly are collected by an oversized material collection system.

When a screen assembly is mounted on a screen deck, the side edges of the screen assembly typically just abut or rest against side rails of the screen deck. In some instances, it is possible for oversized materials to travel around the side edges of the screen assembly and to fall into the undersized material collection system. This is problematic, as the entire point of conducting screening is to separate undersized material from oversized material.

In many screen decks, the bottom of the screen assembly is supported by a plurality of elongated support members that are spaced apart between the first and second side rails of the screen deck. Because the side edges of a screen assembly often are not secured to the side rails of the screen deck, it is possible for the material of the screen assembly to sag downward at locations between the elongated support members, particularly when loaded with material to be screened. The sag of the screen assembly between elongated support members can distort the screening apertures in the screen assembly, leading to improper or inefficient screening.

DETAILED DESCRIPTION

The present disclosure relates to systems and methods for screening materials, in particular, for separating materials of varying sizes. Embodiments of the present disclosure include a screen deck that can be mounted to a screening machine and a screen assembly configured to mounted to the screen deck. The present disclosure also relates to methods of making a screen deck and a screen assembly, and methods of using the screen deck and the screen assembly to screen materials.

Figure 1:
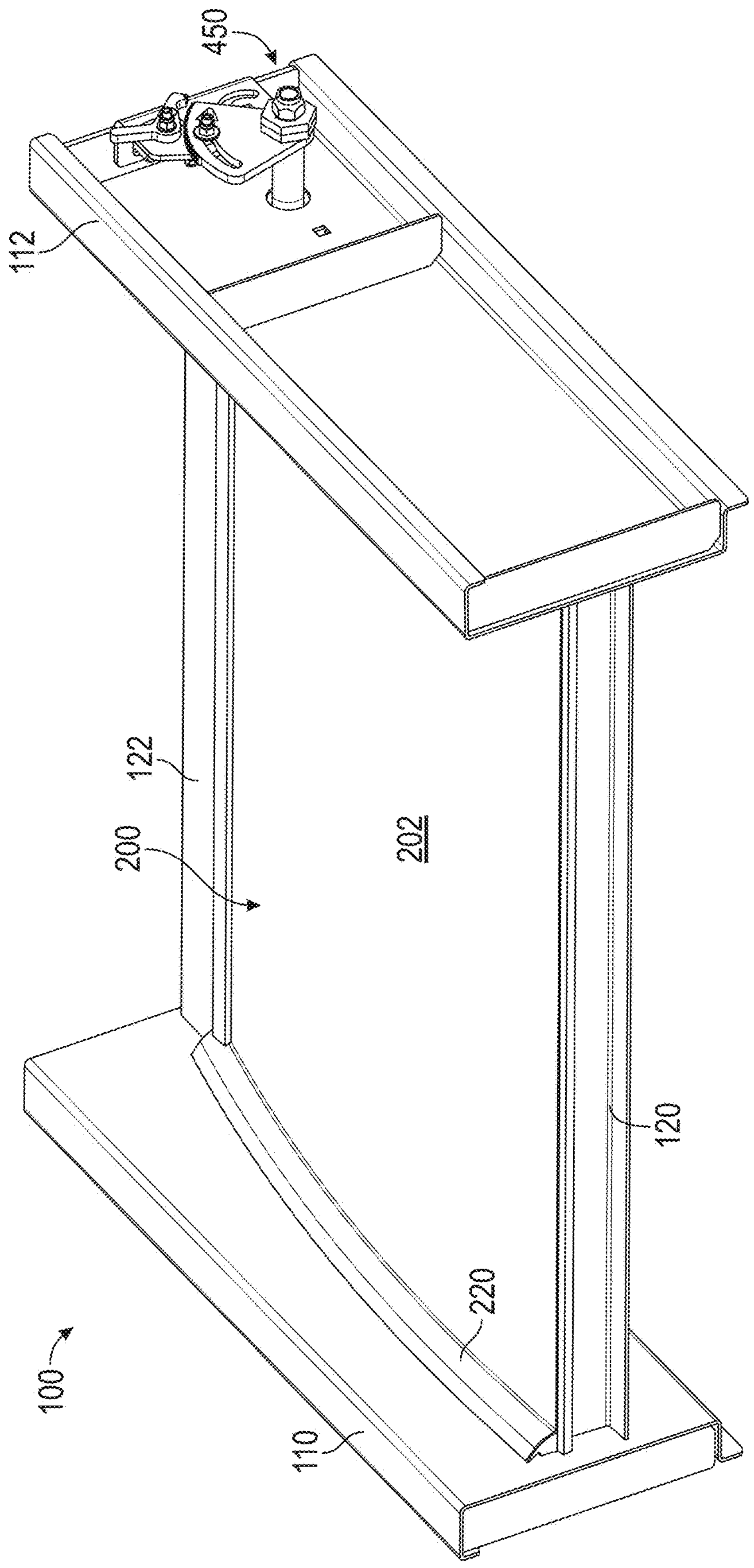
FIG. 1 is a perspective view showing a screen deck and a screen assembly mounted on the screen deck.

FIG. 1 illustrates a screen deck 100, upon which a screen assembly 200 is removably mounted. The screen deck includes a first side rail 110 and a second side rail 112. A front end plate 120 at a front of the screen deck 100 extends between the first and second side rails 110, 112. A rear end plate 122 at the rear of the screen deck 100 also extends between the first and second side rails 110, 112. The screen deck also includes a tensioning mechanism 450, located at either the front or the rear of the screen deck 100, which is described in greater detail below.

The screen deck 100 includes mounting mechanisms that are configured to removably mount a screen assembly 200 to the screen deck 100. As will be explained in greater detail below, the front and rear edges of a screen assembly 200 are mounted to a first type of mounting mechanism. First and second side edges of the screen assembly 200 are mounted to a second, different type of mounting mechanism.

In one embodiment, the front and rear edges of the screen assembly 200 are configured include hooks or hook strips that are configured to hook onto corresponding mounting structures on the front end plate 120 and the tensioning mechanism 450 located at the rear of the screen deck 100. FIGS. 5A-5C and 7A-7C illustrate two alternate embodiments of screen assemblies 200, 300 that could be removably mounted on the screen deck 100. As illustrated in FIG. 5B, one embodiment of a screen assembly 200 includes a front hook 210 on the front edge of the screen assembly 200 and a rear hook 212 on a rear edge of the screen assembly 200. FIG. 7B illustrates that another embodiment of a screen assembly 300 that includes a different type of front hook 310 on a front edge of the screen assembly 300 and a corresponding different type of rear hook 312 on a rear edge of the screen assembly 300.

Figure 2:
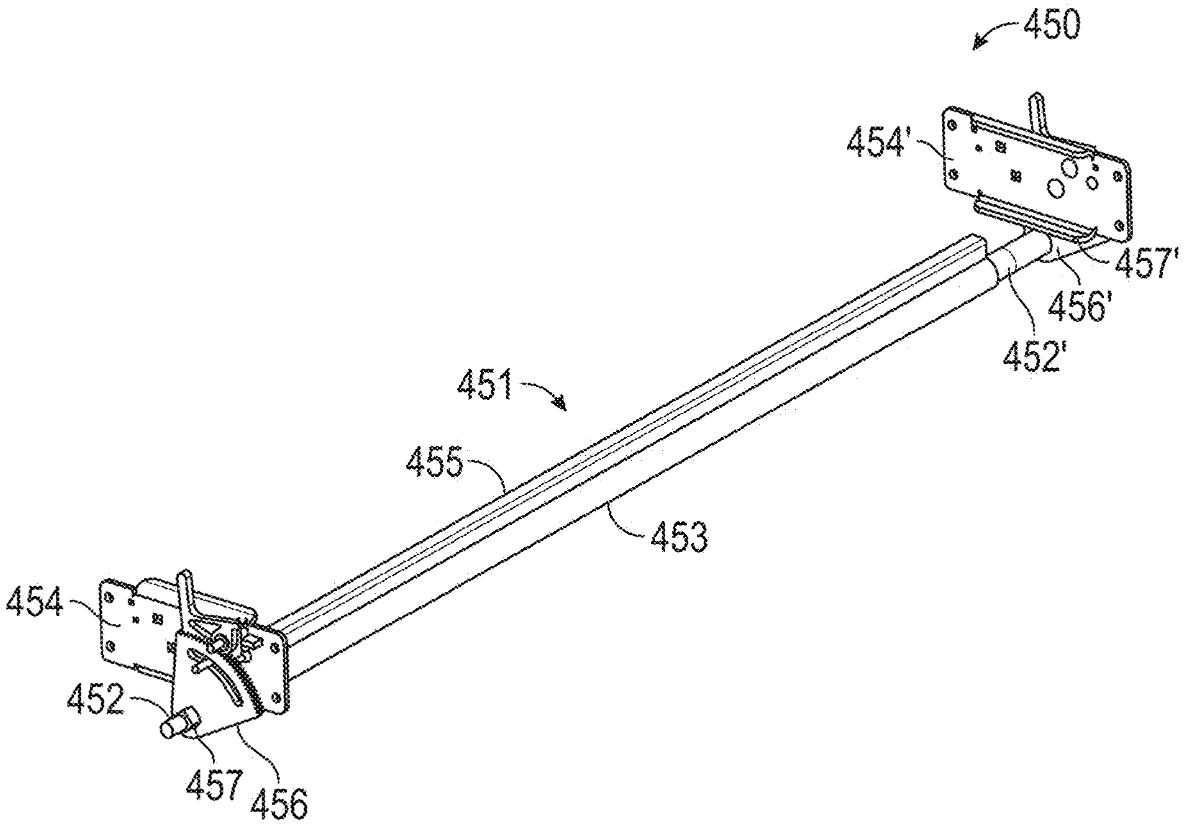
FIG. 2 is a perspective view of a tensioning mechanism that is configured to removably mount a screen assembly to a screen deck and to selectively tension the screen assembly.

To removably mount a screen assembly 200/300 on the screen deck 100, one would place the screen assembly 200/300 on a central receiving area of the screen deck and then cause the front hook 210/310 to engage one or more corresponding hooked features or mounting strips on the front end plate 120 of the screen deck 100. One then causes the rear hook 212/312 of the screen assembly 200/300 to engage with a corresponding tensioning strip 455 of the tensioning mechanism 450, as illustrated in FIG. 2. The hooked tensioning strip 455 is mounted on a rotatable tensioning rod 451. The tensioning rod 451 is then rotated such that the hooked tensioning strip 455 interacting with the rear hook 212/312 of the screen assembly 200/300 tensions the screen assembly 200/300. The tensioning rod 451 is then locked in position so that the screen assembly 200/300 is held on the screen deck 100 and such that a desired amount of tension is applied to the screen assembly 200/300.

Details of the tensioning mechanism 450 are illustrated in FIG. 2. As shown therein, the tensioning mechanism includes the tensioning rod 451, brackets 454 and 454', and ratchet mechanisms 456 and 456'. The brackets 454, 454' are attached to the first and second side channels 110, 112 of the screen deck 100. Tensioning rod 451 includes opposing, mirror image ends 452 and 452,' a tubular midportion 453, and the tensioning strip 455. Opposing ends 452 and 452' of tensioning rod 451 extend through holes 457 and 457' in ratchet mechanisms 456 and 456', respectively, and are secured to ratchet mechanisms 456 and 456' by securing mechanisms, such as bolts. Ratchet mechanisms 456 and 456' are secured to the brackets 454 and 454'.

While not shown in FIG. 2, the tubular mid-portion 453 of the tensioning rod 451 extends the width of screening deck 100 from the first side channel 110 to the second side channel 112. As mentioned above, the tensioning strip 455 of the tensioning mechanism 450 is configured to hook to the rear hook 212/312 of a screen assembly 200/300 mounted on the screen deck 100. When the tensioning rod 451 rotates, the tensioning strip 455 rotates to apply tension to the screen assembly 200/300.

Figure 3:
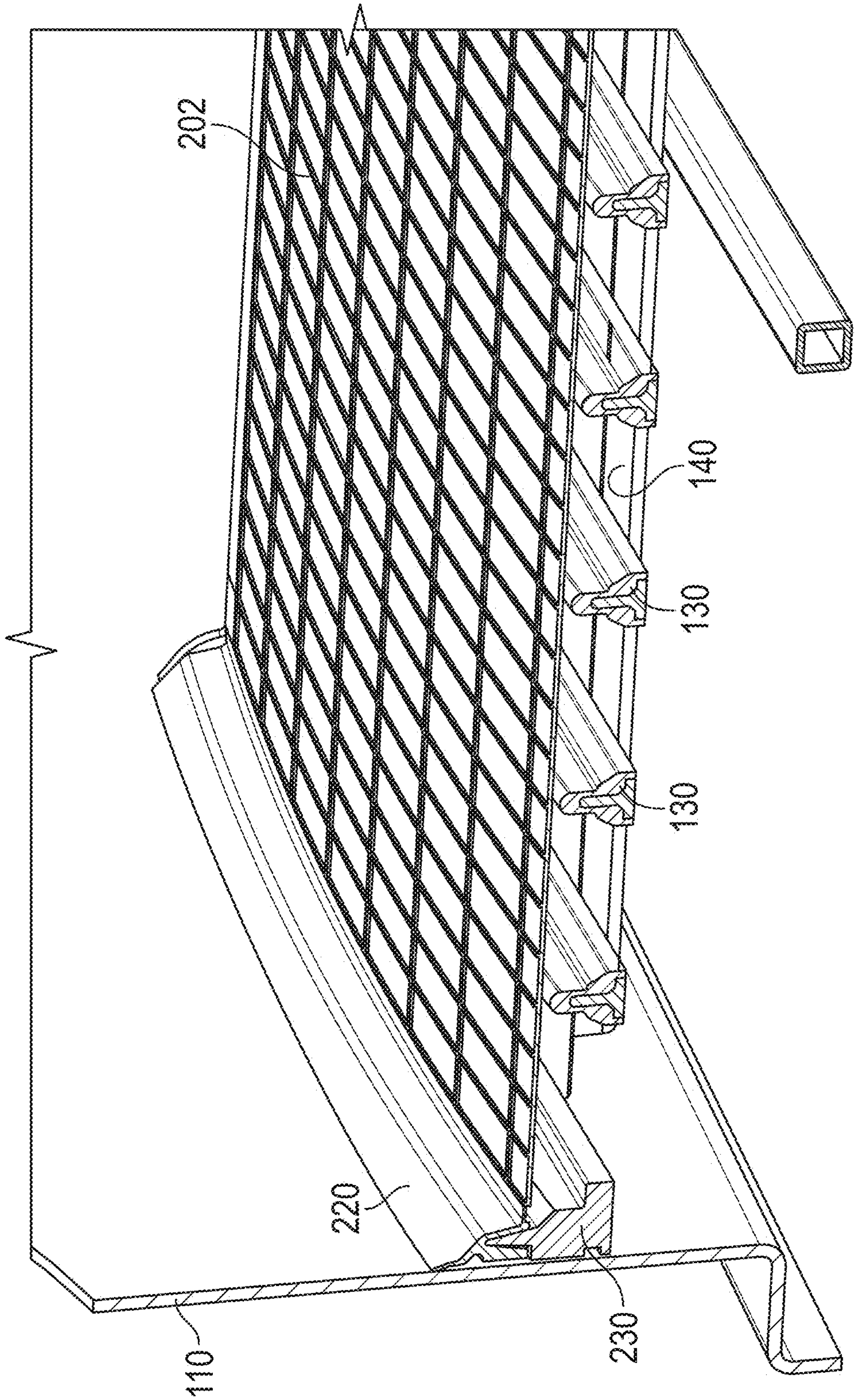
FIG. 3 is an enlarged, cross-sectional perspective view of a portion of the screen deck and screen assembly illustrated in FIG. 1.
Figure 4A:
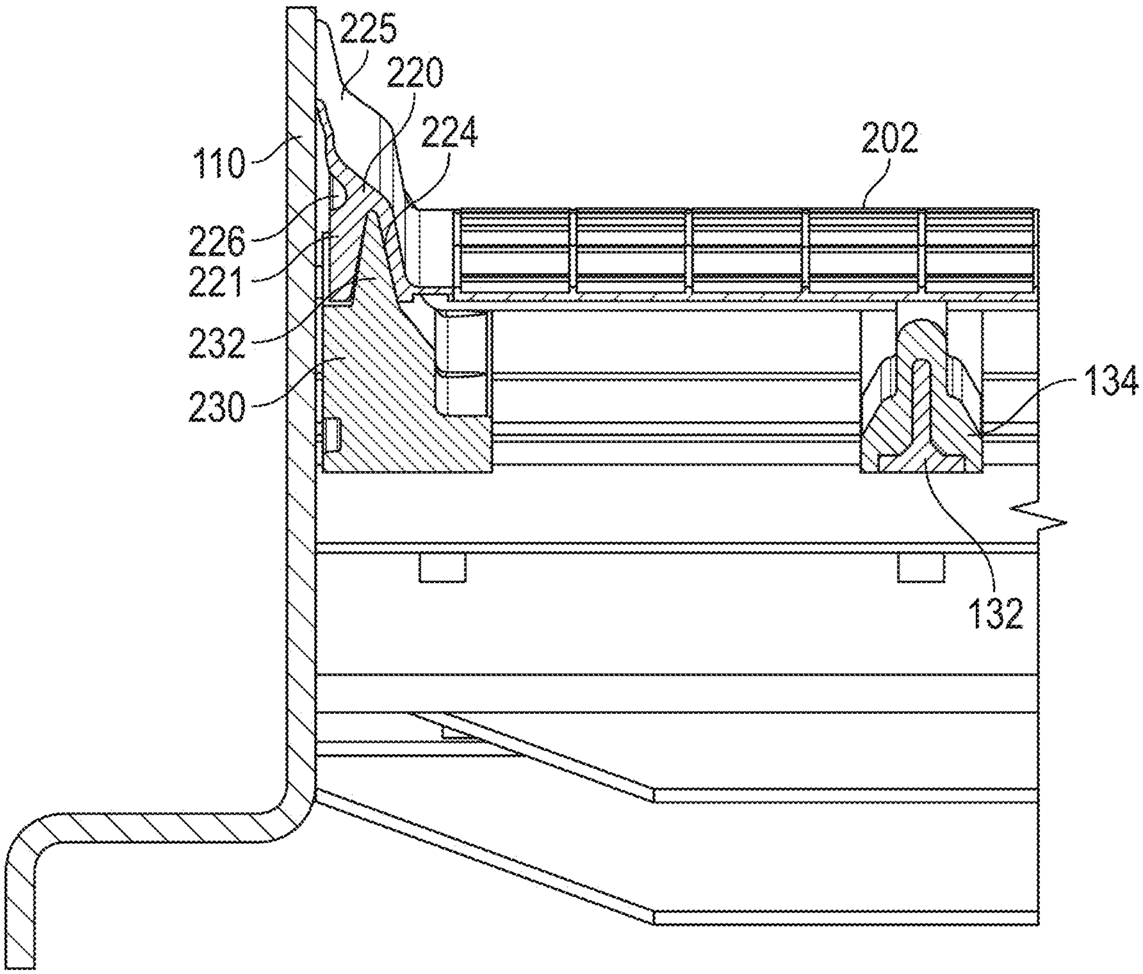
FIG. 4A is another enlarged, cross-sectional perspective view of a portion of the screen deck and screen assembly illustrated in FIGS. 1 and 3.

FIG. 3 is a perspective and sectional view of a portion of the screen deck 100 and screen assembly 200 illustrated in FIG. 1. FIG. 4A is a sectional view of just a portion of the screen deck 100 with a screen assembly 200 mounted thereon. These sectional views illustrate some of the additional internal structures of the screen deck 100.

As shown in FIGS. 3 and 4A, the screen deck 100 includes a plurality of elongated support members 130 that extend from the front of the screen deck 100 to the back of the screen deck 100. The elongated support members 130 can be supported by one or more support ribs 140 that extend between the first side rail 110 and the second side rail 112. The elongated support members 130 provide support to the central screening area 202 of the screen assembly 200.

As shown in FIG. 4A, each elongated support member 130 can include a rigid elongated support element 132 that is covered by a removable and replaceable elongated support member cover 134. The top of the elongated support member cover 134 contacts and supports the bottom of the screen assembly 200. The elongated support member cover 134 can be formed of a relatively soft and flexible material to help reduce wear or damage to the bottom surface of the screening area of the screen assembly. If rubbing friction between the top of the elongated support member cover 134 and the bottom of a screen assembly 200 cause the top of the elongated support member cover 134 to wear or degrade, the elongated support member cover 134 can be replaced with a new elongated support member cover 134.

As also shown in FIG. 4A, the side edges 220 of the screen assembly 200 are removably mounted to side mounting assemblies that are provided on the first and second side rails 110, 112 of the screen deck 100. Although FIG. 4A illustrates only the side mounting assembly on the first side rail 110, a similar side mounting assembly is provided on the second side rail 112 of the screen deck 100 to removably couple the second side edge of the screen assembly 200 to the screen deck 100.

FIG. 4A illustrates a first embodiment of a side mounting assembly that includes a first side mounting member 230 having an upwardly extending projection 232. The upwardly extending projection 232 is received in a corresponding first mounting recess 224 formed on the first side edge 220 of the screen assembly 200, the first mounting recess 224 opening toward the bottom surface of the screen assembly 200. The top portion of the upwardly extending projection 232 and the top portion of the first mounting recess 224 are located above a top surface of the central screening area 202 of the screen assembly 200.

The first side mounting member 230 with the upwardly extending projection 232 can be a single integrated structure that extends from the front of the screen deck to the rear of the screen deck. Alternatively, the first side mounting member 230 could include a plurality of side mounting members, as will be described in greater detail below.

Any sort of fixation device or devices can be used to attach the first side mounting member 230 to the first side rail 110. In some embodiments, the first side mounting member 230 can be attached to a side rail fixture, and the side rail fixture can be attached to the first side rail 110 of the screen deck 100.

In this embodiment of the screen assembly 200, the first side edge 220 includes an upwardly extending tip 225 that extends far above the central screening surface 202 of the screen assembly 200. The profile of the first side edge 220 angles inward and downward from the upwardly extending tip 225 to the central screening surface 202 of the screen assembly 200. As a result, any material placed on the top of the screen assembly 200 for screening is channeled inward and downward to the central screening portion 202 of the screen assembly 200 where screening apertures are located.

The upwardly extending tip 225 of the first side edge 220 is flexible and the material of the upwardly extending tip 224 is configured such that it will tend to push against and seal against the inner surface of the first side rail 110. The material of the upwardly extending tip 225 is configured such that if the screen assembly is not mounted on a screen deck, the upwardly extending tip will extend outward away from the outer side surface of the remainder of the first side edge 220. As a result, when the screen assembly is mounted to a screen deck, the outer surface of the upwardly extending tip 225 applies a biasing force against the inner surface of the first side rail 110 which helps to seal the upwardly extending tip against the inner surface of the side rail 110 to ensure material to be screened on top of the screen assembly does not bypass the screen assembly around the first side edge 220.

In some embodiments, an inwardly extending depression 226 is formed on the outer surface of the middle portion of the first side edge 220. That depression 226 would extend over all or a portion of the length of the first side edge 220 from the front of the screen assembly 200 to the rear of the screen assembly 200. The depression 226 serves to increase the flexibility of the first side edge 220, which can aid mounting a screen assembly 200 to the screen deck, and may also help to ensure that the outer surface of the tip 225 forms a seal against the inner surface of the side rail 110.

Figure 4B:
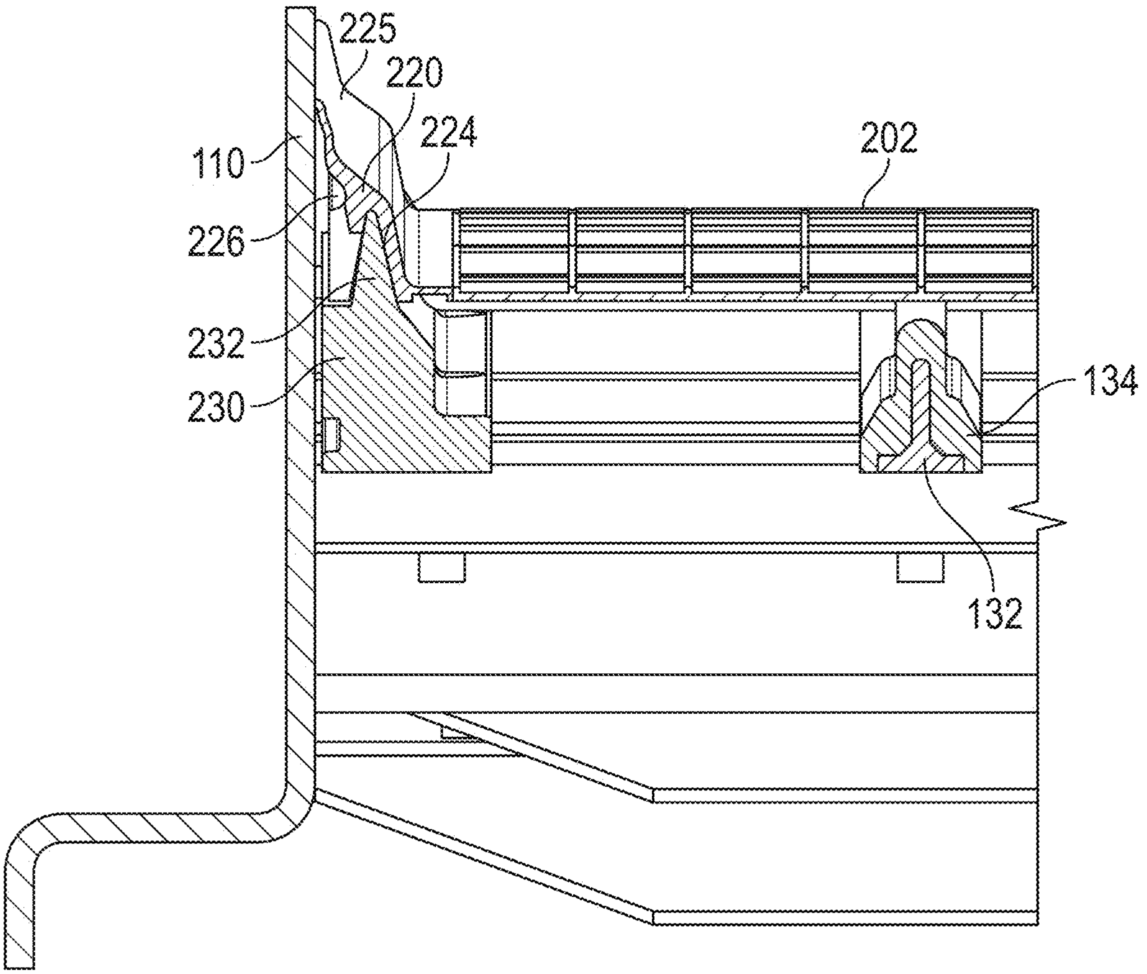
FIG. 4B is another enlarged, cross-sectional perspective view of a portion of the screen deck and an alternate embodiment of a screen assembly.

In the embodiment illustrated in FIG. 4A, the first side edge 220 includes a foot 221 that is located on the outer side of the first side mounting member 230 when the screen assembly is mounted to the screen deck. In an alternate embodiment, as depicted in FIG. 4B, the first side edge 220 lacks a foot. However the first side edge 220 still includes a first mounting recess 224 to receive the upper portion of the upwardly extending projection 232 of the first side mounting member 230.

Figure 4C:
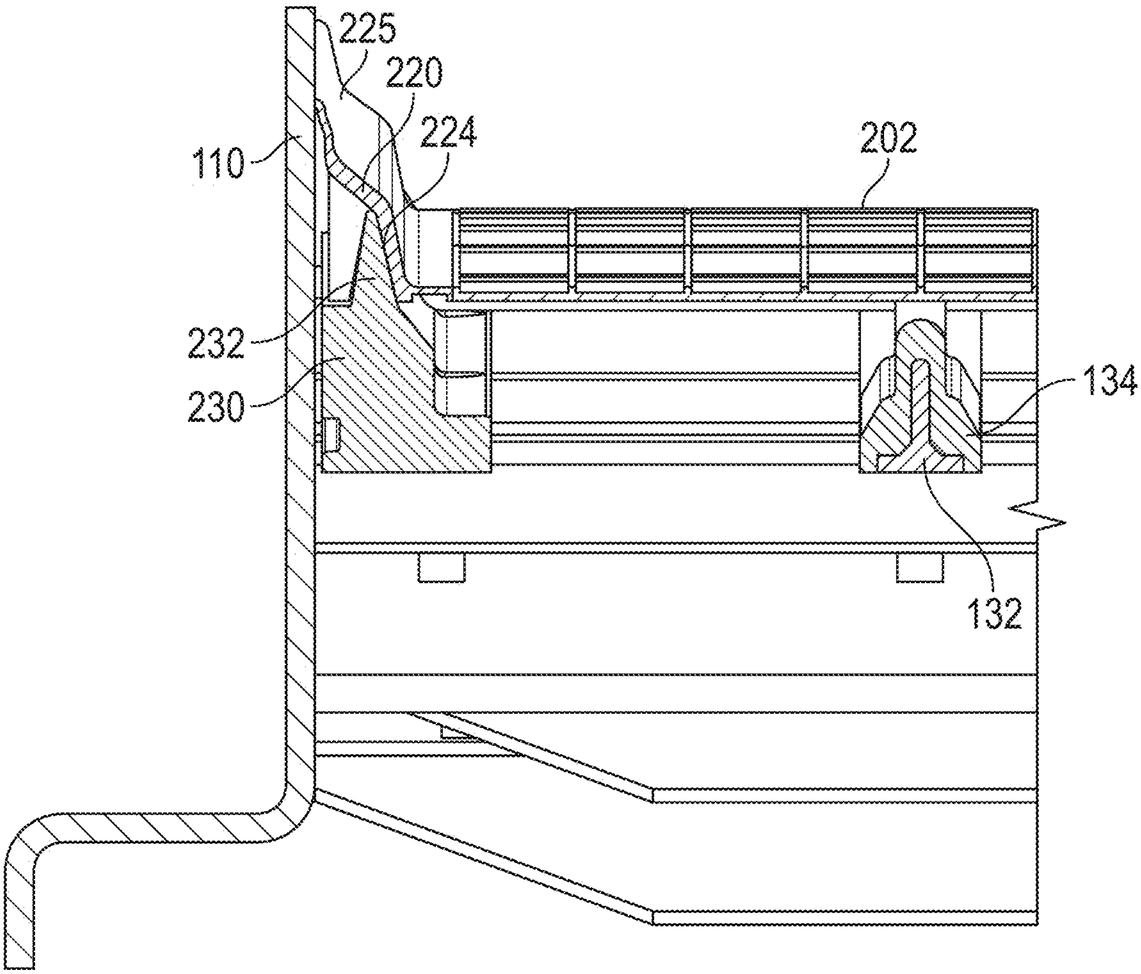
FIG. 4C is another enlarged, cross-sectional perspective view of a portion of the screen deck and another alternate embodiment of a screen assembly.
Figure 4D:
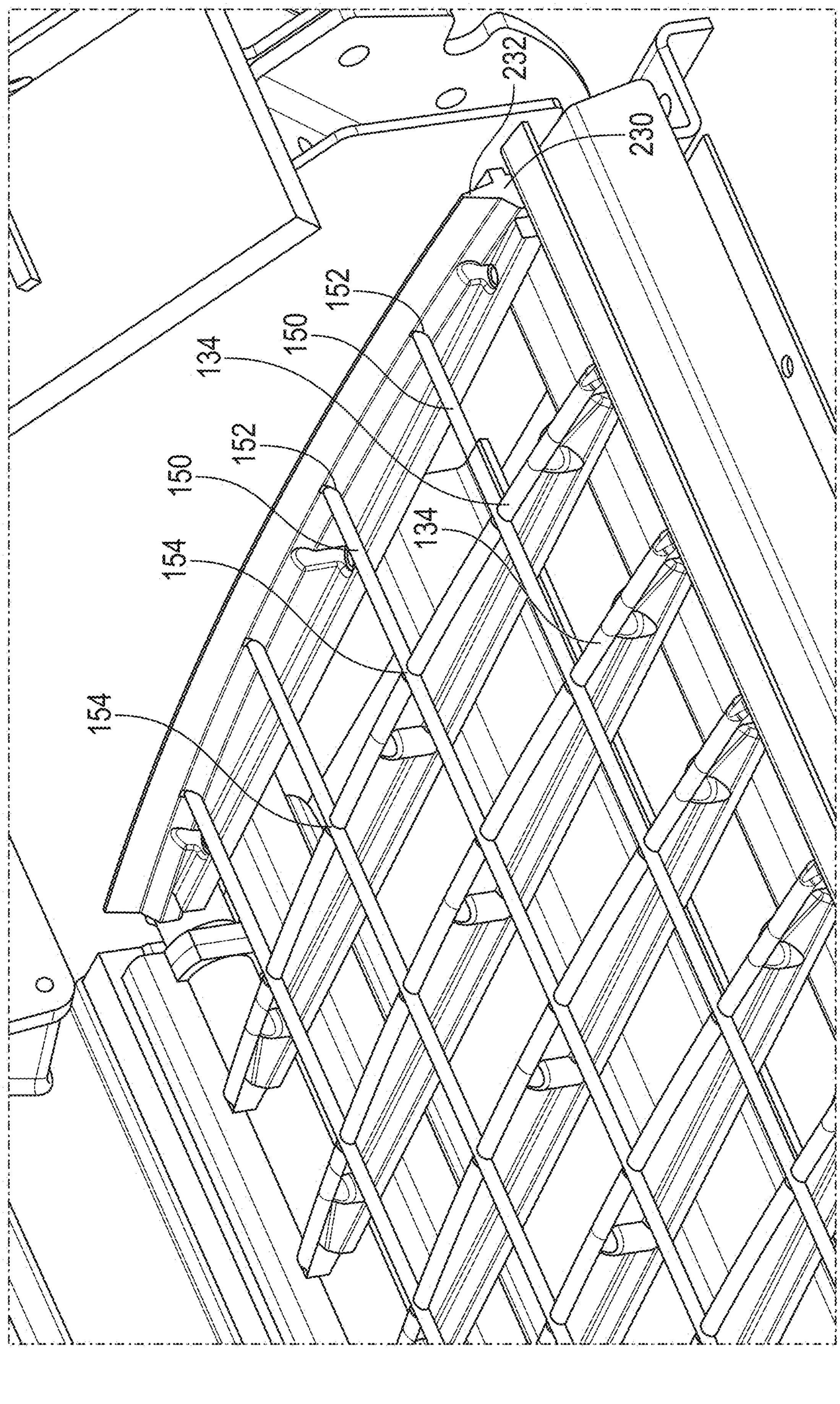
FIG. 4D is an enlarged, cross-sectional view of a portion of another embodiment of a screen deck.

FIG. 4C shows another embodiment of the first side edge 220 which also lacks a foot. In this embodiment, there is no longer a recess that receives the top portion of the upwardly extending projection 232 of the first side mounting member 230. Instead, when the screen assembly is secured to the screen deck by tensioning the screen assembly in the front-to-back direction, the tensioning forces pull the outer side surface of the lower portion of the first side edge 220 against the inner surface of the upwardly extending projection 232 of the first mounting member 230. The shape of the first side edge 220 ensures that the upwardly extending tip 225 rests against the inner surface of the side rail 110 of the screening machine. And because the outer side surface of the lower portion of the first side edge 220 is being pressed/pulled into engagement with the inner surface of the upwardly extending projection 232, any material to be screened on top of the screen assembly that somehow works its way around the interface between inner surface of the side rail 110 and the outer surface of the upwardly extending projection 225 is prevented from passing down under the screen assembly to the undersized material collection assembly.

FIG. 4C is a perspective view of another embodiment of a screen deck with the screen assembly removed to reveal the structure that supports a screen assembly. As shown in FIG. 4C, this embodiment still includes elongated support members with elongated support member covers 134. The elongated support members extend in the front-to-back direction of the screen deck.

Mounting apertures 154 are provided on the top edges of the elongated support member covers 134. Corresponding mounting apertures may also be formed on the top edges of the elongated support members that are under the elongated support member covers 134. Support rods 150 that extend in the side-to-side direction are mounted in the mounting apertures 154 in the top edges of the elongated support member covers 134 such that top surfaces of the support rods 150 are substantially level with top surfaces of the elongated support member covers 134. The ends of the support rods 150 are mounted in mounting apertures 152 provided on the side of the side mounting member 230.

The screen assembly that is mounted on the screen deck is then supported by both the elongated support member covers 134 which extend in the front-to-back direction as well as the support rods 150 which extend in the side-to-side direction. The support rods 150 help to prevent a screen assembly from sagging between adjacent elongated support member covers 134. This, in turn, prevents distortion of the screening apertures in the central screening portion 202 of the screen deck 200, which promotes efficient screening of material.

Examples of how support rods can be incorporated in a screen deck similar to what is depicted in FIG. 4C is disclosed in U.S. Pat. No. 12,318,812, the contents of which are incorporated herein by reference.

A screen deck as depicted in FIG. 4C, which includes support rods 150 that extend in the side-to-side direction is one way of helping to prevent the screen assembly from sagging between the elongated support members 130 that extend in the front-to-back direction. In alternate embodiments, the screen deck may include one or more mechanisms that enable the screen deck to apply tension of the first and second side edges 220, 222 of the screen assembly in the side-to-side direction to help to prevent sagging of the screen assembly between the elongated support members.

For example, one or both of the side mounting members 230 that are attached to the side rails 110, 112 of the screen deck could be movably mounted to the side rails 110, 112. If this is the case, a new screen assembly could be mounted to the screen deck while one or both of the side mounting members 230 are positioned towards the center of the screen deck. Once the screen assembly has been mounted such that the upwardly extending projections 232 have been received in the corresponding mounting apertures 224, 227 of the screen assembly, one or both of the side mounting members 230 could be moved outward. This would result in the upwardly extending projections 232 tensioning the screen assembly in the side-to-side direction to prevent the screen assembly from sagging between the elongated support members 130.

Figure 5A:
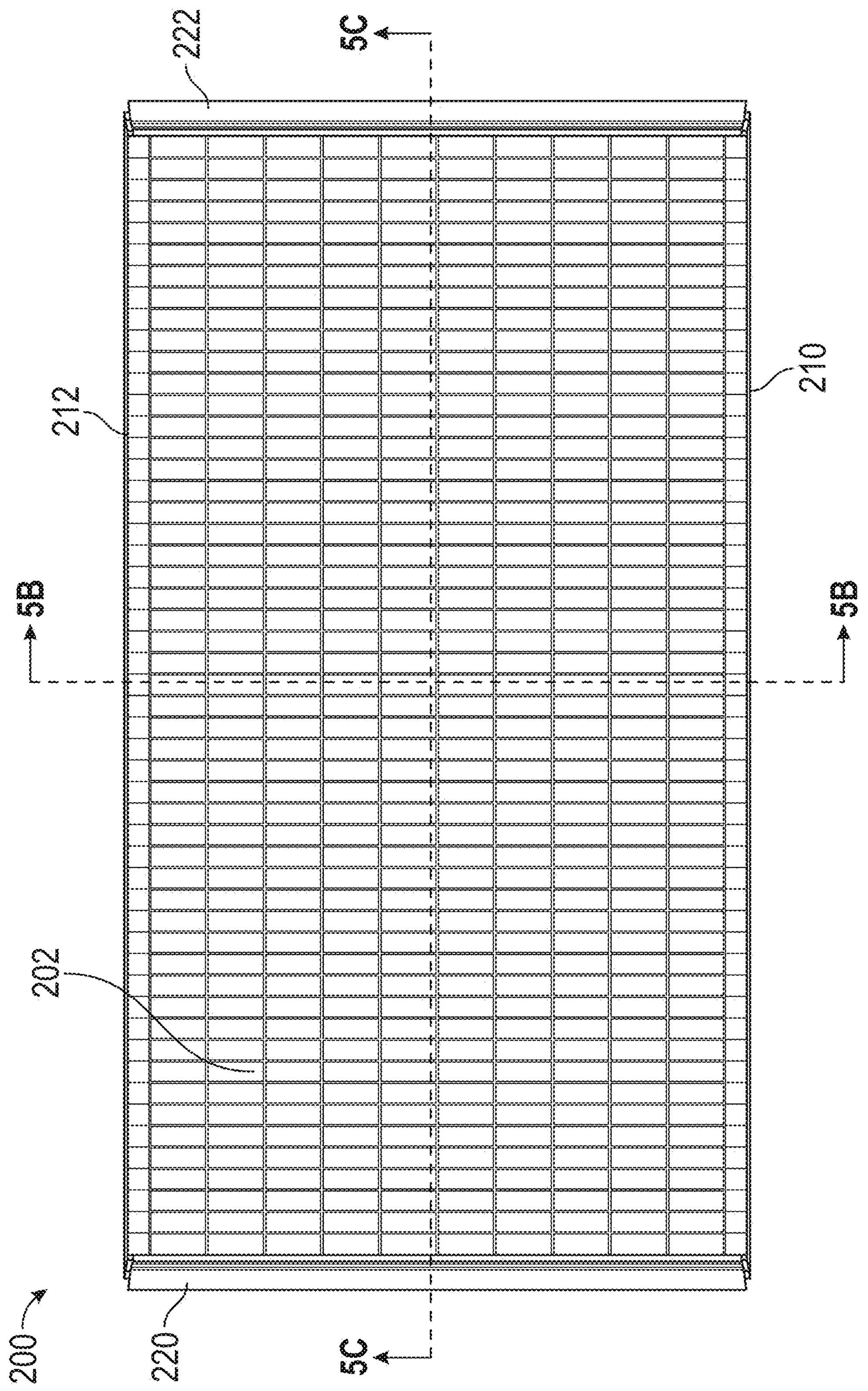
FIG. 5A is a top view of a screen assembly configured to be mounted on a screen deck as illustrated in FIG. 4.
Figure 5B:
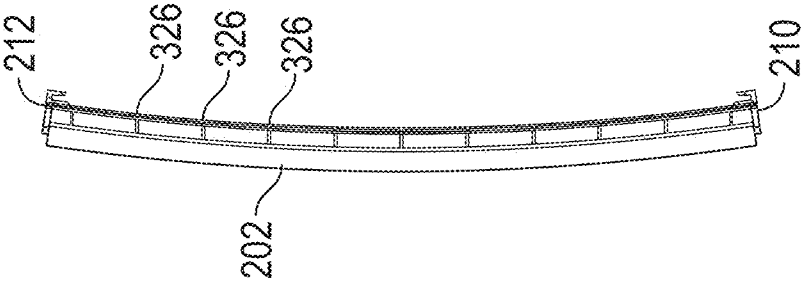
FIG. 5B is a first cross-sectional view of the screen assembly illustrated in FIG. 5A taken along section line 5B-5B in FIG. 5A.
Figure 5C:
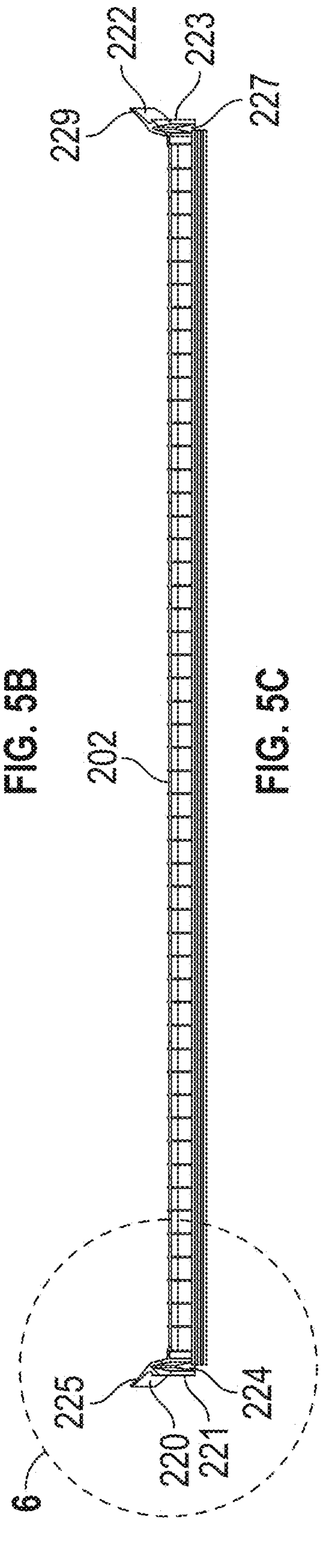
FIG. 5C is a second cross-sectional view of the screen assembly illustrated in FIG. 5A taken along section line 5C-5C in FIG. 5A.

FIGS. 5A-5C illustrate details of a first embodiment of a screen assembly 200 that is configured to be mounted on a screen deck as depicted in FIG. 4A and/or FIG. 4B. As shown in FIG. 5A, the screen assembly 200 includes a central screening area 202. Screening apertures are located in the central screening area 202. The opening sizes of the screening apertures determine the size of the undersized particles that can fall through the screen assembly 200 into an undersized material collection system located below the screen assembly 200.

As mentioned above, a front hook 210 is located on the front edge of the screen assembly 200 and a rear hook 212 is located on the rear edge of the screen assembly 200. FIG. 5B illustrates that in this embodiment, the front hook 210 and the rear hook 212 have squared off profiles.

Figure 6:
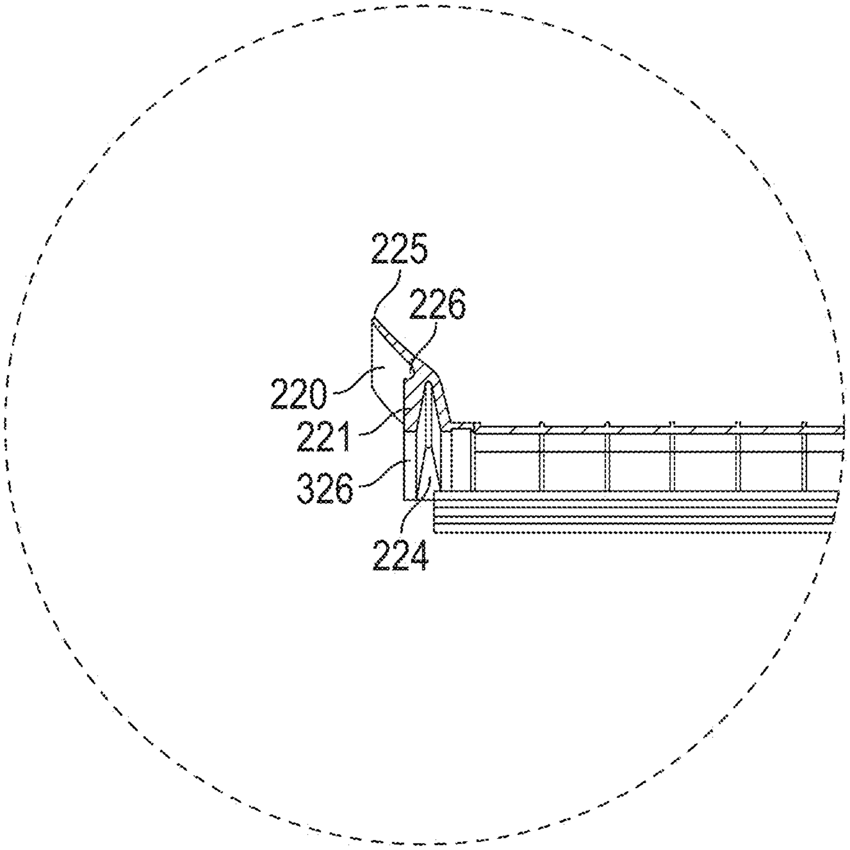
FIG. 6 is an enlarged cross-sectional view of a side of a screen assembly corresponding the circled portion in FIG. 5C.

FIG. 5C is a cross-sectional view taken along section line 5C-5C in FIG. 5A. FIG. 5C helps to illustrate the configuration of the first side edge 220 and the second side edge 222. FIG. 6 provides an enlarged view of the first side edge 220 of the screen assembly when the screen assembly 200 is not mounted on a screen deck.

As shown in FIGS. 5C and 6, the first side edge 220 includes a first mounting recess 224 configured to receive an upwardly extending projection 232 of a first side mounting member 230 mounted to a first side rail 110 of a screen deck. A similar first mounting recess 227 is provided on the second side edge 222 of the screen assembly.

A depression 226 is provided on the outer side of the first side edge 220 of the screen deck. In some embodiments, the depression 226 extends from the front of the screen assembly to the rear of the screen assembly. In alternate embodiments, a series of depressions could be formed along the outer side of the first side edge 220 running from the front to the rear of the screen assembly. A similar depression is provided on the outer side of the second side edge 222 of the screen assembly 200.

In some embodiments, a downwardly extending foot 221 is provided on the first side edge 220 between the first mounting recess 224 and the depression 226. A similar downwardly extending foot is provided on the second side edge 222. Also, there is an upwardly extending tip 225 on the first side edge 220 and a similar upwardly extending tip 229 on the second side edge 222 of the screen assembly 200.

As is apparent from FIG. 6, the upwardly extending tip 225 extends outward from the other portions of the first side edge 220 when the screen assembly is not mounted on a screen deck. When the screen assembly 200 is mounted on a screen deck, the tip 225 of the first side edge 220 is pushed inward by the inner surface of the first side rail 110, as depicted in FIG. 4A. The deformation of the original shape of the tip 225 results in the tip 225 pushing against the inner side of the first side rail 110 to seal the tip 225 against the inner surface of the first side rail 110, which helps to prevent any material being screened on the top surface of the screen assembly 200 from bypassing the screen assembly around the side edges 220, 222 of the screen assembly 200.

In some embodiments, the downwardly extending foot 221 on the side edges may include a series of slits, cuts or apertures that extend from side to side. Such slits, cuts or apertures 326 are shown in FIGS. 5B and 6. The slits, cuts or apertures 326 could extend upward from the bottom of the foot 221 to only a part of the full height of the foot 221. In other embodiments, the slits, cuts or apertures 326 may extend substantially the full height of the foot 221. The slits, cuts or apertures 326 would be provided at intervals along the length of the side edges, as shown in FIG. 5B.

Such slits, cuts or apertures 326 make it easier to fold or roll a screen assembly so that it can packaged in a small shipping container. Also, because the slits, cuts or apertures 326 make the screen assembly itself more flexible, the slits, cuts or apertures 326 can also make it easier to position and mount the screen assembly on a screening machine, and to remove a screen assembly from a screening machine.

As mentioned above in the Background section, the object of the screening process is to have small particles of undersized material pass though screening apertures in the central screening area 202 of the screen assembly 200 so that the undersized material arrives at an undersized material collection system located under the screen assembly 200. Larger, oversized particles of material that cannot pass though the screening apertures of the screen assembly 200 travel along the top surface of the screen assembly 200 and then fall off the front or rear edges of the screen assembly 200.

One problem with existing screen assembly designs is that oversized particles of material placed on the top of the screen assembly which are incapable of passing though the screening apertures of the screen assembly may nevertheless end up in the undersized material collection system located under the screen assembly because the oversized particles of material travel around the side edges 220, 222 of the screen assembly 200.

The design of the side edges 220, 222 of the screen assembly 200 and the corresponding side mounting assemblies of the screen deck 100 disclosed herein make it nearly impossible for oversized particles of material located on the top of the screen assembly 200 to travel around the side edges 220, 222 of the screen assembly 200 to arrive at an undersized material collection system located under the screen assembly 200.

To begin with, the upwardly extending tips 225, 229 of the side edges 220, 222 of the screen assembly are sufficiently high above the screening surface 202 that it is unlikely the oversized particles would fall between the upwardly extending tips 225, 229 and the inner surfaces of the first side rail 110 and second side rail 112 of the screen deck 100. Also, as explained above, the upwardly extending tips 225, 229 fit snugly against the inner surfaces of the side rails 110, 112 to help prevent the ingress of oversized particles of material between the side edges 220, 222 of the screen assembly 200 and the side rails 110, 112 of the screen deck 100.

Second, if any oversized particles do penetrate into the interface between the side edges 220, 222 of the screen assembly 200 and the side rails 110, 112 of the screen deck 100, such oversized particles must still travel up and around the interface between the sides of the upwardly extending projections 232 of the side mounting assemblies 230 and the inner surfaces of the first mounting recesses 224, 227 of the screen assembly 200. It is highly unlikely that any oversized particles of material could travel along that path to arrive at an undersized material collection system located under the screen assembly 200.

In addition, when a new screen assembly 200 is mounted on the screen deck 100, the maintenance person mounting the screen assembly would position the downwardly extending feet 221, 223 of the side edges 220, 222 of the screen assembly 200 in the space between the upwardly extending projections 232 and the inner walls of the first and second side rails 110, 112 of the screen deck 100. This results in the upwardly extending projections 232 being received in the corresponding first mounting recesses 224, 227 of the side edges 220, 222 of the screen assembly 200. When the tensioning mechanism 450 then applies tension to the screen assembly 200 to secure the screen assembly 200 onto the screen deck 100, the tension applied to the screen assembly 200 serves to draw the inner surfaces of the first mounting recesses 224, 227 tightly against the outer surfaces of the upwardly extending projections 232. This tight fit further serves to prevent any oversized particles of material from traveling along the interface between the upwardly extending projections 232 and the first mounting recesses 224, 227 on the screen assembly 200.

Also, because the first mounting recesses 224, 227 of the first and second side edges 220, 222 of the screen assembly 200 are secured over the upwardly extending projections 232 on the screen deck 200, the first and second side edges 220, 222 of the screen assembly 200 are prevented from pulling away from the inner sides of the first and second side rails 110, 112 of the screen deck 100. This helps to prevent oversized materials from bypassing around the side edges 220, 222 of the screen assembly 200. It also helps to prevent the material of the screening portion 202 of the screen assembly 200 from sagging between the underlying elongated support members 130 that support the underside of the screen assembly 200. This, in turn, prevents distortion of the screening apertures in the central screening portion 202 of the screen deck 200, which promotes efficient screening of material.

Figure 7A:
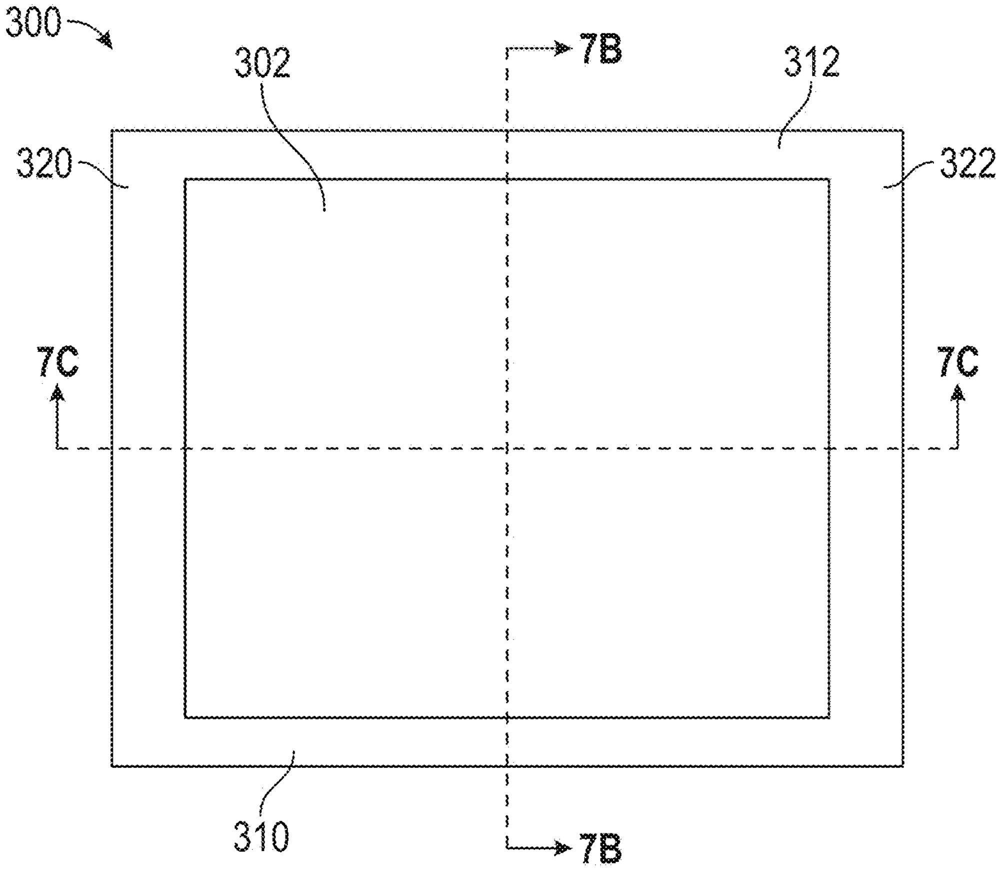
FIG. 7A is a top view of another embodiments of a screen assembly configured to be mounted on a screen deck.
Figure 7B:
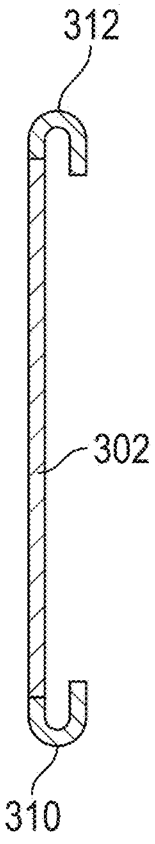
FIG. 7B is a first cross-sectional view of the screen assembly illustrated in FIG. 7A taken along section line 7B-7B in FIG. 7A.
Figure 7C:
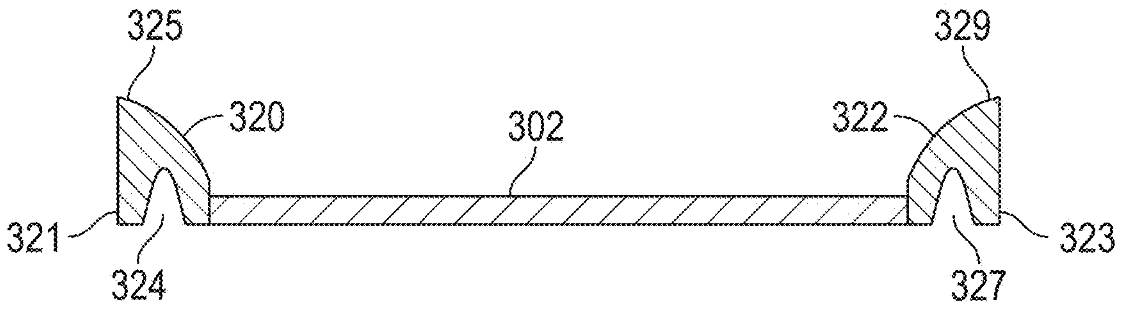
FIG. 7C is a second cross-sectional view of the screen assembly illustrated in FIG. 7A taken along section line 7C-7C in FIG. 7A.

FIGS. 7A-7C illustrate an alternate embodiment of a screen deck 100 and screen assembly 300. In this embodiment of the screen assembly 300, the front hook 310 located on the front edge of the screen assembly 300 and the rear hook 312 located on the rear edge of the screen assembly 300 have curved profiles.

As illustrated in FIG. 7C. the configuration of the first side edge 320 and the second side edge 322 lack recesses on the outer sides of the first and second side edges 320, 322. Further, the upwardly extending tips 325, 329 that project upward from the first and second side edges 320, 322 do not extend as far upward as the embodiment discussed above, and the upwardly extending tips 325, 329 lack the flexibility of the upwardly extending tips 229, 229 of the previous embodiment. That said, the first and second side edges 320, 322 still include first mounting apertures 324, 327 that receive the upwardly extending projections 232 on the screen deck. And large particles of material being screened would still have to travel though the interface between the inner surface of the mounting apertures 324, 327 and the upwardly extending projections 232 in order to bypass the screen assembly 300 around the sides of the screen assembly 300, which is highly unlikely to occur.

Figure 8:
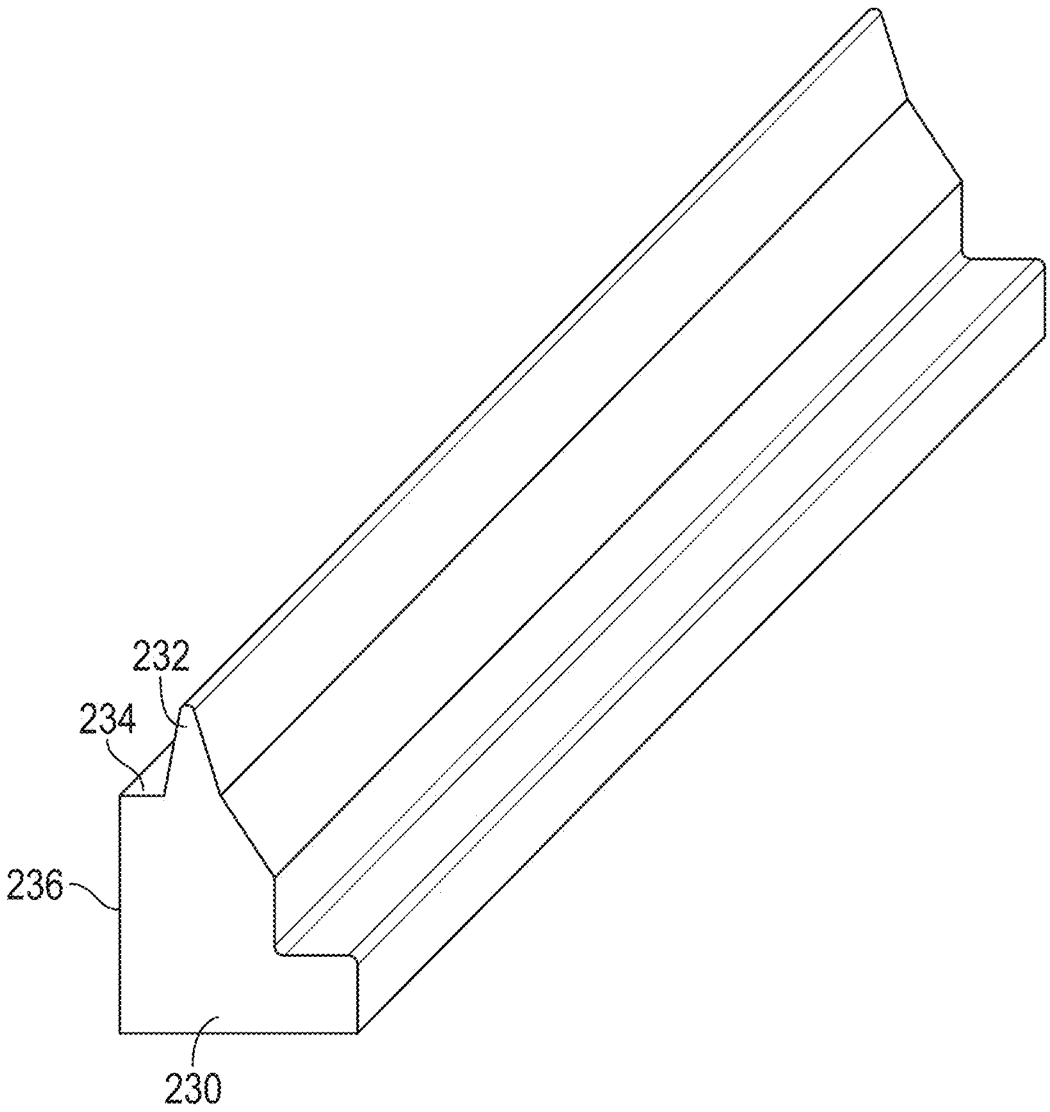
FIG. 8 is a perspective view of portions of a first embodiment of a side mounting assembly that can be part of a screen deck as illustrated in FIG. 1.

FIG. 8 illustrates one embodiment of a first mounting member 230 that could be part of a side mounting assembly located on a first or second side rail 110, 112 of a screen deck 100. The first side mounting member 230 includes an upwardly extending projection 232. A side edge 236 of the first mounting member 230 would abut the inner surface of a side rail 110, 112 of a screen deck 100. When a screen assembly 200/300 is mounted on a screen deck 100 having the first side mounting member 230, the bottom of a downwardly projecting foot 221, 223, 321, 323 of a side edge 220, 222, 320, 322 of the screen assembly 200, 300 would rest on a side ledge 234 of the side mounting member 230. Also, the upwardly extending projection 232 would be received in a first mounting recess 224/324 of a side edge 220/320 of the screen assembly 200/300.

Figure 9:
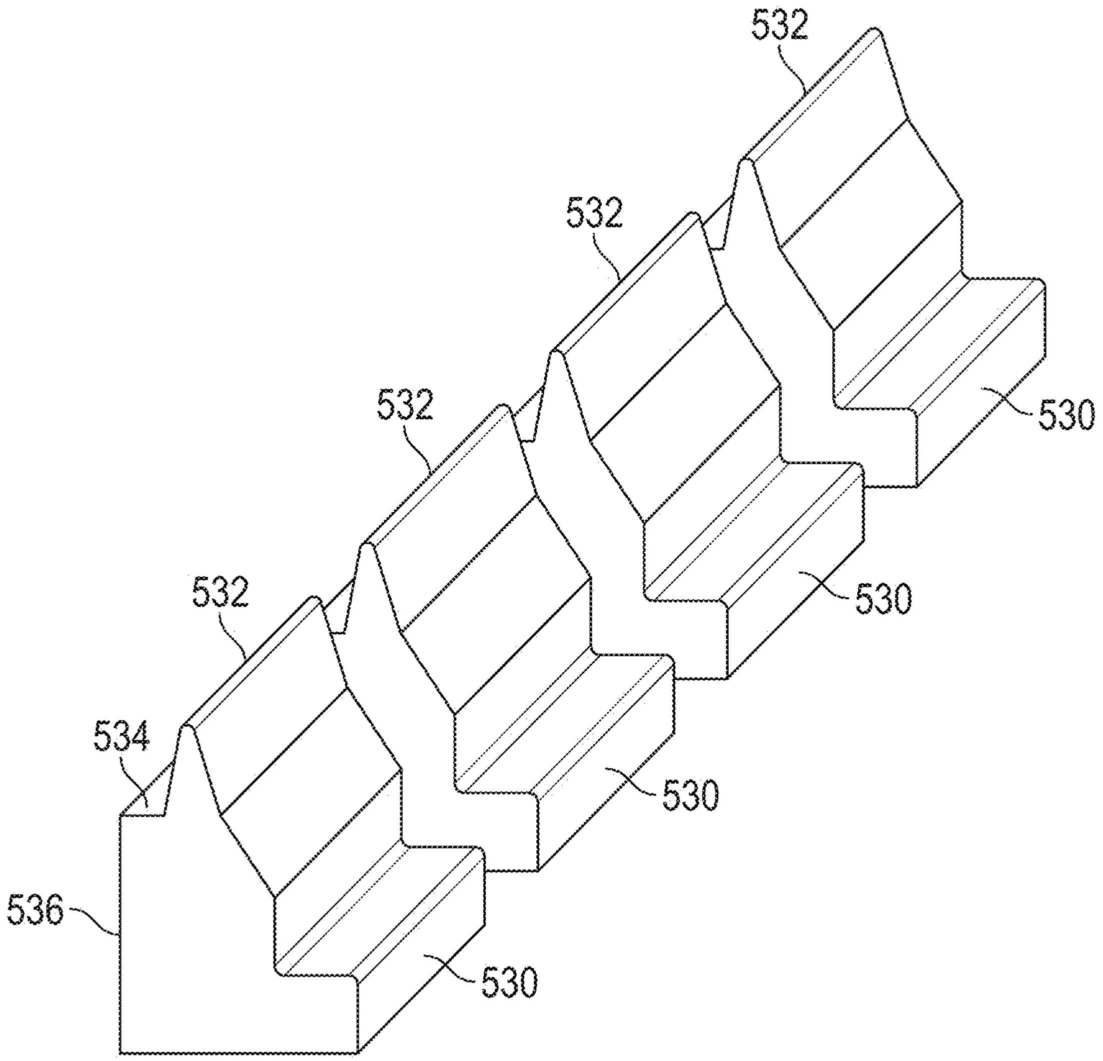
FIG. 9 is a perspective view of portions of a second embodiment of a side mounting assembly that can be part of a screen deck as illustrated in FIG. 1.

FIG. 9 illustrates an alternate embodiment of a side mounting assembly for a screen deck. In this embodiment, a plurality of side mounting members 530 would be attached to the inner surface of a side rail 110, 112 of a screen deck 100. Each side mounting member 530 includes an upwardly extending projection 532, a side surface 536 and a ledge 534. One or more of the individual side mounting members 530 would be received in the first mounting recess 224/324 of a single screen assembly 200/300.

FIGS. 10A-10D illustrate various different configurations for the side edges of a screen assembly. Although these figures illustrate some possible configurations for the side edges of a screen assembly, various other different configurations having different features could also be provided. Thus, the depictions of side edges in FIGS. 5C, 7C and 10A-10D should in no way be considered limiting.

Figure 10A:
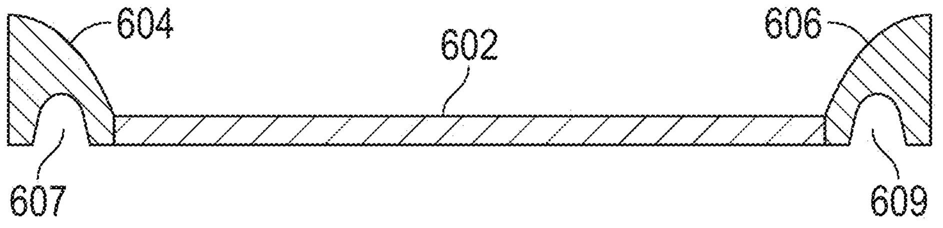
FIGS. 10A-10D are cross-sectional views of various embodiments of a screen assembly illustrating different configurations of the side edges.

FIG. 10A is a cross-sectional view of an embodiment of a screen assembly 602 with first and second side edges 604, 606 that each includes a first mounting aperture 607, 609 that has a rounded inner profile. This type of screen assembly 602 would be mounted on a screen deck having first and second side mounting assemblies with rounded upwardly extending projections that are received in the first mounting apertures 607, 609.

Figure 10B:
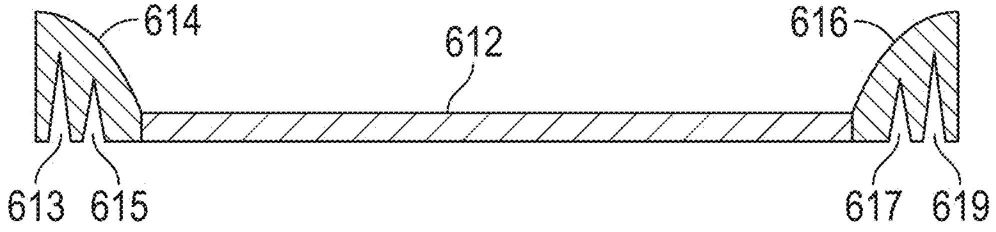

FIG. 10B is a cross-sectional view of another embodiment of a screen assembly 612 with first and second side edges 614, 616 that each include two mounting apertures. The first side edge 614 includes a first small mounting aperture 615 and a larger and taller second mounting aperture 613. The second side edge 616 likewise includes a first smaller mounting aperture 617 and a second larger and taller aperture 619. In this embodiment, the top portions of all the mounting apertures are located above a top surface of the screening area of the screen assembly 612. In alternate embodiments, only the larger of the two mounting apertures 613, 619 is located above the top surface of the screening area, with the top portions of the smaller mounting apertures 615, 617 being located even with or below the top surface of the screening area.

Figure 10C:
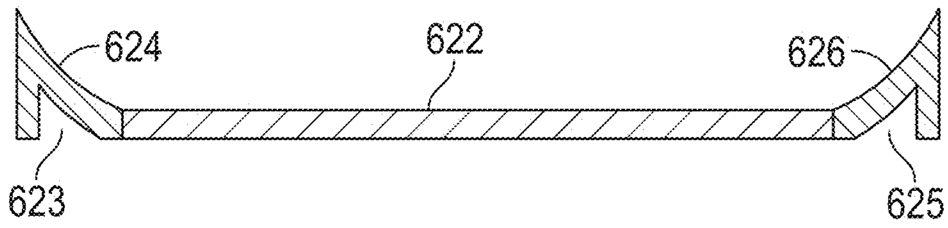

FIG. 10C is a cross-sectional view of another embodiment of a screen assembly 622 with first and second side edges 624, 626 that each includes a single mounting aperture 623, 625. In this embodiment, the outer upper surfaces of the first and second side edges 624, 626 are concave. Also, the mounting apertures 623, 625 in this embodiment have a profile with an inner upper surface that corresponds with the profile of the outer upper surfaces of the side edges 624, 626.

Figure 10D:
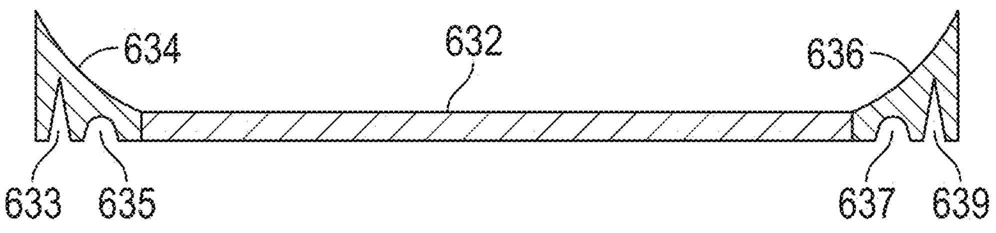

FIG. 10D is a cross-sectional view of another embodiment of a screen assembly 632 with first and second side edges 634, 636 that each include two mounting apertures. The mounting apertures in the first side edge 634 includes a first straight-edged mounting aperture 633 that extends to a location considerably above the top surface of the screening area of the screen assembly 632. The first side edge 634 also includes a second smaller and rounded mounting aperture 635 that does not extend to the same height above the screening surface as the first mounting aperture 633. The second side edge also includes a first straight-edged mounting aperture 639 and a second smaller and rounded mounting aperture 637.

In each of the screen assemblies described above, the side edges of the screen assembly could be integral with the central screening area. In other words, the side edges could be formed of the same material and could be molded or formed at the same time as the central screening area of the screen assembly.

Alternatively, a screen assembly as described above could be formed in multiple parts that are joined together. For example, and using the screen assembly 200 in FIGS. 5A-5C as an example, the central screening area 202 could be formed from one or multiple parts. The central screening area could then be joined to first and second side edges 220, 222 that are formed separately. The side edges 220, 222 could be attached to the central screening area 202 via any viable method, to include fusing, laser welding, adhesives or gluing or via other means.

A screen assembly that is configured to be mounted to a screen deck as discussed above can have a central screening area that is formed by attaching a plurality of small injection molded screen elements together along their side edges. The central screening area could then be attached to first and second side edges that include mounting apertures as also described above. Examples of screen assemblies that are formed from a plurality of injection molded screen elements that are joined edge-to-edge are disclosed in U.S. Pat. No. 11,819,884, the contents of which is incorporated herein by reference.

Figure 11A:
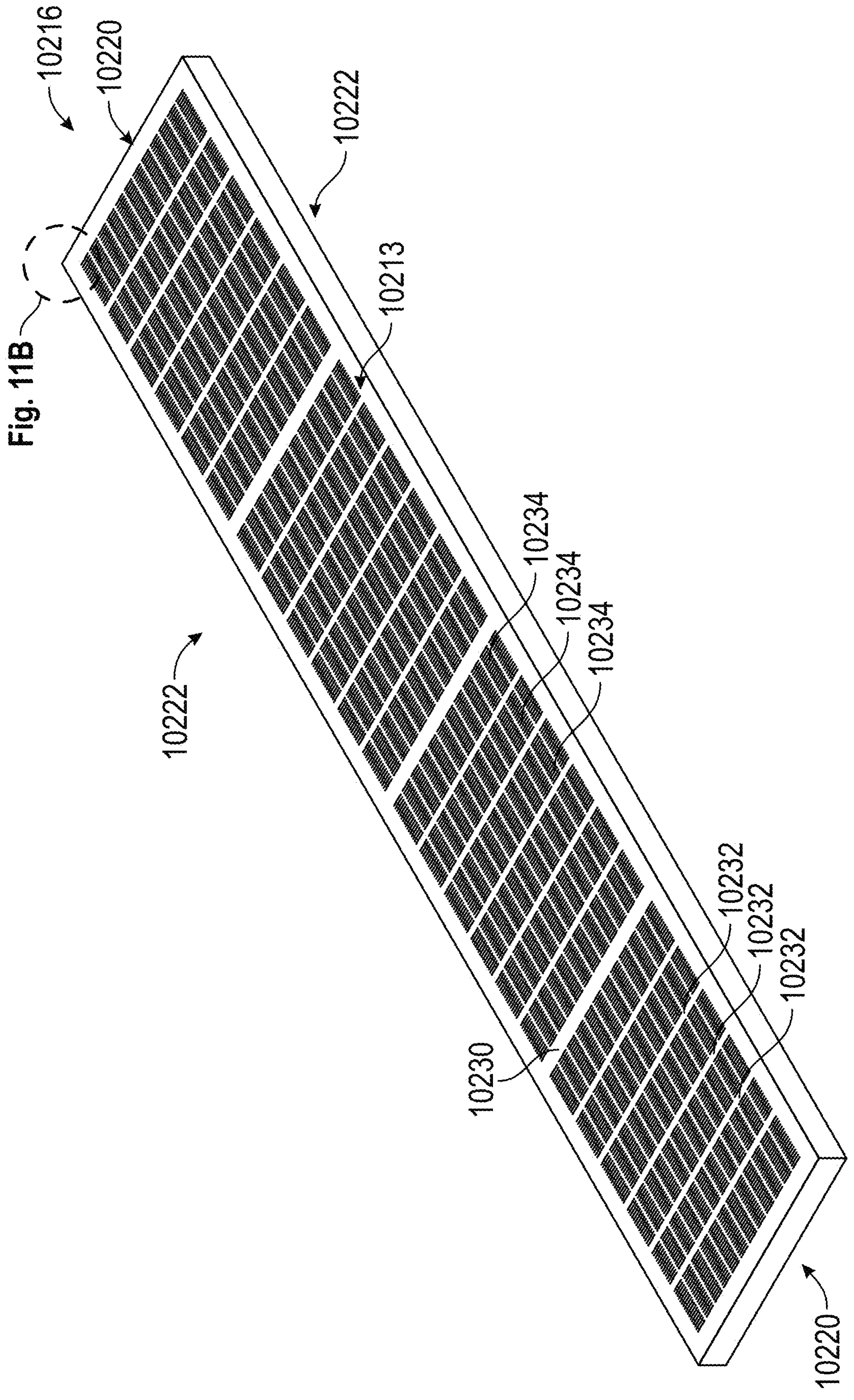
FIG. 11A illustrates an injection molded thermoplastic screen element.
Figure 11B:
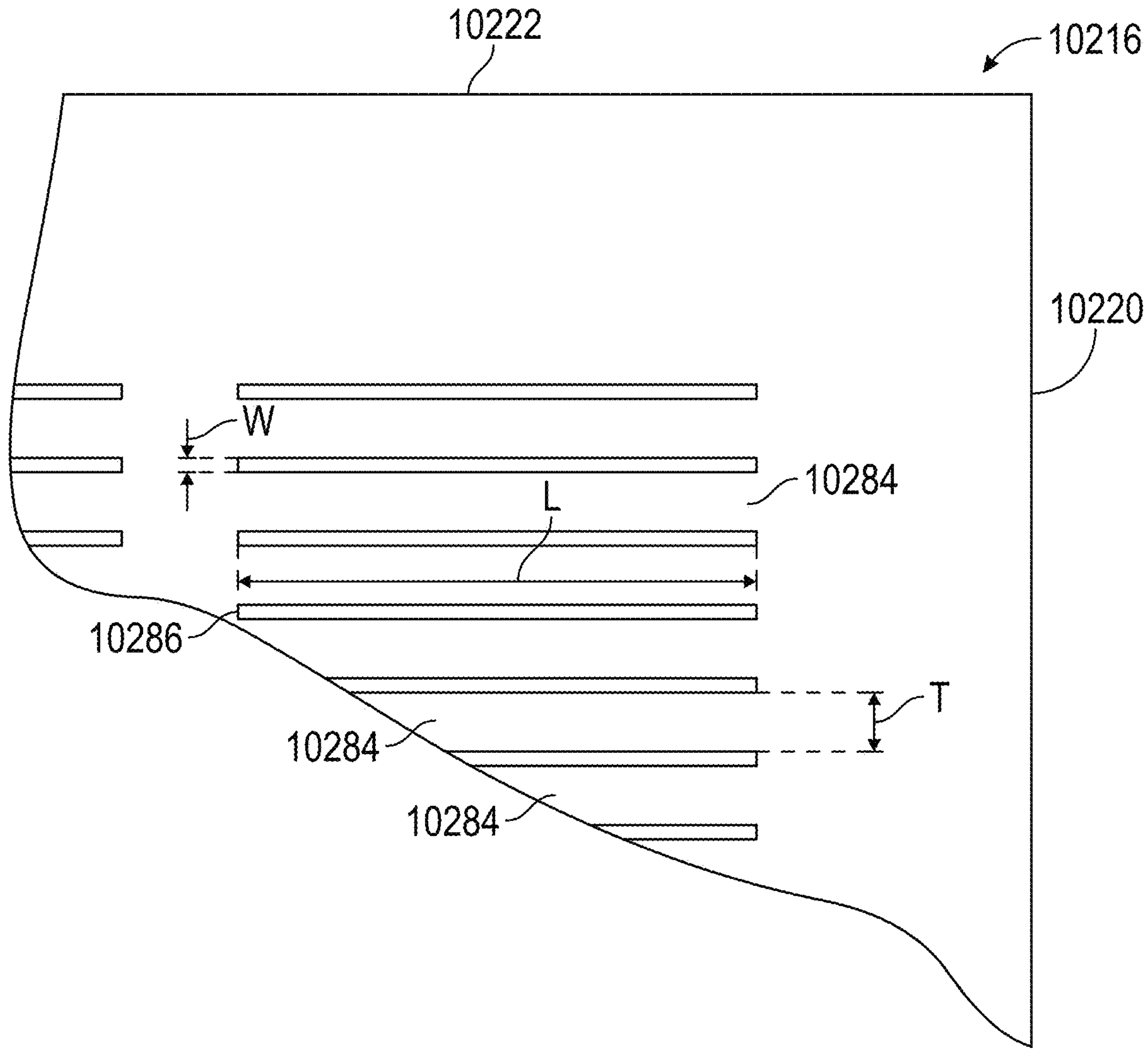
FIG. 11B illustrates a detailed view of a portion of the injection molded thermoplastic screen element depicted in FIG. 11A.

FIGS. 11A and 11B illustrate an injection molded thermoplastic screen element 10216 having substantially parallel end portions 10220 and substantially parallel side portions 10222 that are substantially perpendicular to the end portions 10220. As depicted in FIG. 11B, the screening surface 10213 includes surface elements 10284 running parallel to the side portions 10222 and forming screening openings 10286. Each screen element 10216 is a single thermoplastic injection molded piece.

As illustrated in FIG. 11B, the surface elements 10284 have a thickness T that extends between adjacent screening openings 10286 and which may vary depending on the screening application and configuration of the screening openings 10286. T may be, for example, approximately 10 microns to approximately 4000 microns, depending on the embodiment. Forming the screen surface elements 10284 to have a thickness T of between 50 -150 microns can provide a screening surface with desirably high open screening area values, depending on the width W of the screening openings 10286. The screening openings 10286 are elongated slots having a length L and a width W, which may be varied for a chosen configuration. The width W may be a distance of approximately 10 microns to approximately 6000 microns between inner surfaces of adjacent screen surface elements 10284. In some embodiments, the width W may be a distance of approximately 25 microns to approximately 2000 microns between inner surfaces of adjacent screen surface elements 10284. The screening openings 10286 are not required to be rectangular but may be thermoplastic injection molded to any shape suitable to a particular screening application, including approximately square, circular and/or oval, as discussed herein.

Screen elements may be made from various materials depending on the desired properties of the resulting screen assembly. Thermoplastic polyurethane (TPU) may be incorporated into embodiments of the screen elements and screen assemblies, providing elasticity, transparency (where helpful or necessary), and resistance to water, chemicals having varying pH, oil, grease, and abrasion. TPU also has high shear strength. These properties of TPU are beneficial when applied to embodiments of the screen elements and screen assemblies, which are subjected to high vibratory forces, abrasive materials and high load demands.

The material used to form the screen elements of a screen assembly may be selected to have high temperature tolerance, chemical resistance, hydrolytic resistance, and/or abrasion resistance. Screen elements may incorporate materials, such as TPUs, providing the screen elements with a clear appearance. Clear screen elements may allow for efficient laser transmission through the screen elements for laser welding purposes. However, where laser welding will not be used, the screen elements could be opaque and/or colored. Various different colorants could added to the TPU material to produce screen elements in different colors, where the color may be indicative of various properties of the screen elements. For example, a first color could be used for screen elements having screening openings of a first size, and a second color could be for screen elements having screening openings of a second different size.

Figure 12:
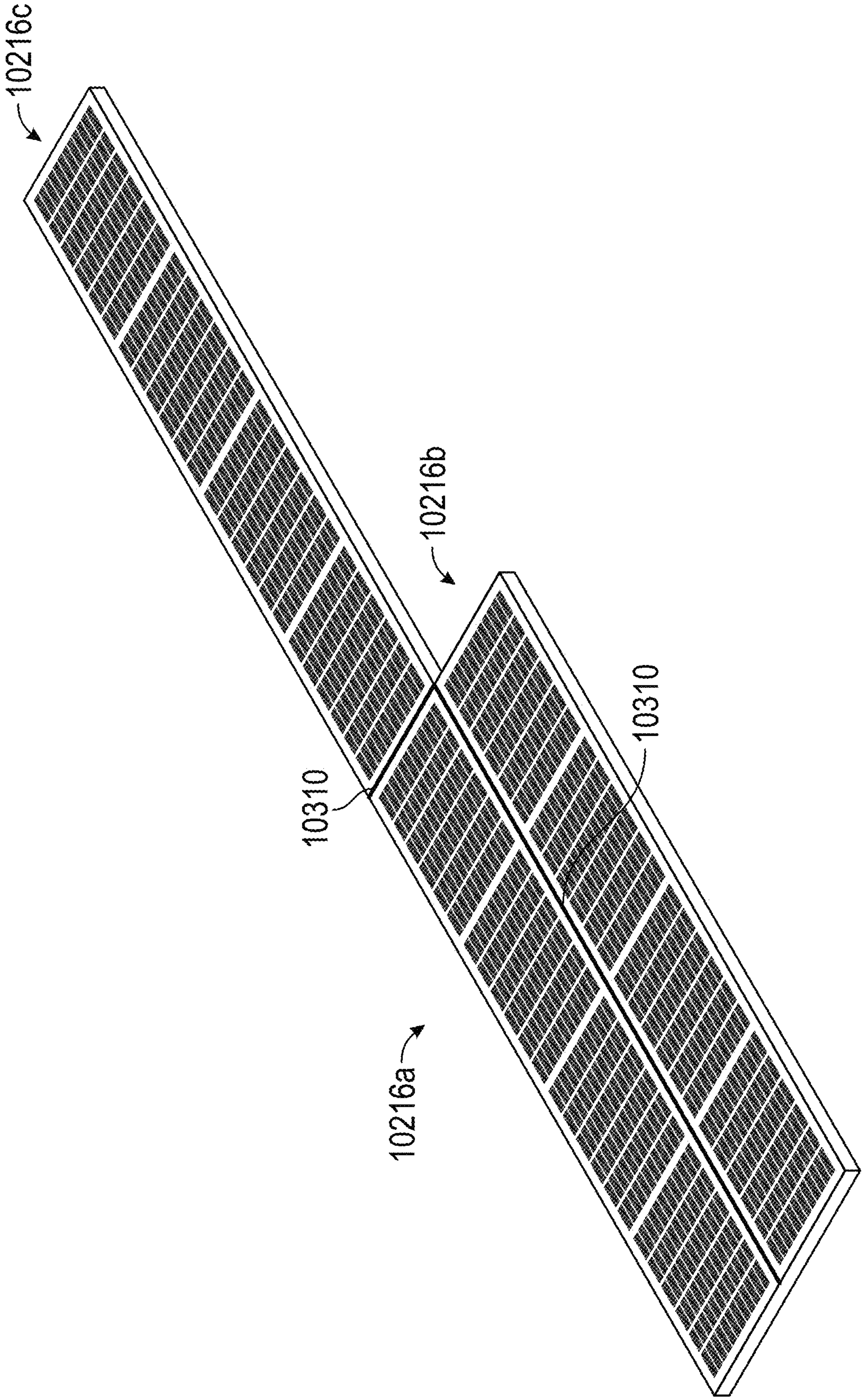
FIG. 12 illustrates multiple injection molded thermoplastic screen elements coupled to each other to form a portion of a screen assembly.

FIG. 12 illustrates how multiple injection molded thermoplastic screen elements 10216*a*, 10216*b*, 10216*c* are coupled to each other along seams 10310 to form a portion of a screen assembly. Multiple injection molded thermoplastic screen elements 10216 may be bonded, joined, or otherwise coupled together in many ways.

In some embodiments, the thermoplastic screen elements may be joined together through welding, wherein two or more thermoplastic screen elements are joined together using heating, pressure, and cooling. “Welding” in this context means causing the material of portions of two screen elements to at least partially melt, bringing the melted portions of the two screen elements together and then allowing the material to cool so that the material of the two screen elements is fused or joined together.

To begin the welding process, the surfaces of the thermoplastic screen elements that are to be joined together, such as adjacent side surfaces 10222 or adjacent end surfaces 10220, are heated to their melting point, or thermoplastic state. This could be a temperature at or above about 380° F. Each thermoplastic material has its own melting point, which may range between for example, 300° F. and 1050° F. The adjacent side surfaces, such as side surface of screen element 10216*a* and screen element 10216*b* are then pressed or otherwise held together until the material cools. Pressure applied to the screen elements 10216*a*, 10216*b* to push the side surfaces together allows the material along the seam 10310 to bond.

In some embodiments, the welding process may employ hot air plastic welding, where hot air is used to heat the thermoplastic. In some embodiments, a hot iron welding process may be used to cause the thermoplastic material along the edges of a screen element to melt. In this type of a process, a heated element such as a heated blade, iron or some other type of heated device is brought adjacent to or in contact with edges of the thermoplastic screen elements to melt the thermoplastic material at the edges.

In some embodiments, a laser or light welding process may employ electromagnetic radiation such as laser light to melt the thermoplastic material at the edges. In yet other embodiments, friction stir welding may be used to join the thermoplastic screen elements together. In friction stir welding, heat is generated by friction between a rotating tool and the adjacent surfaces of the thermoplastic screen elements.

In some embodiments, the weld extends from a top surface of the screen element to the bottom surface of the screen element. In some embodiments, the weld depth extends only partway between the top surface and the bottom surface. In some embodiments the weld depth extends from the top surface or the bottom surface part of the way towards the opposite surface of the screen elements.

In some embodiments, computer numerical control (CNC) machines may automate the welding of the screen elements. Multiple screen elements may be placed into a jig or other form and a CNC machine may control a heating tool such as a laser or other light radiation tool, a heating element, friction stir welding tool, or other some other type of welding tool to melt edges of adjacent screen elements along the seams.

In one exemplary process a heating element in the form of a soldering iron is heated to between 400 and 1000° F. Adjacent edges of two screen elements are pressed together and the heating element is moved along the joint or seam 10310, melting the thermoplastic material on the adjacent edges of the screen elements. In some instances, the heating element is brought adjacent to but not touching the seam, and the heating tool is then moved along the seam to cause the material of the two screen elements to melt and fuse together. In other instances the heating element could be brought into contact with material of the two screen elements at the seam, and the heating element would then be dragged along the seam to cause the material of the two screen elements at the seam to melt and fuse together. Regardless, the screen elements are held together while the material cools. Once cool, the two screen elements are joined together. For example, as shown in FIG. 2, the heating element could be moved or dragged along the two seams 10310 while the three screen elements 10216*a*, 10216*b*, 10216*b* are held together to cause the material of the three screen elements to be joined along the seams 10310.

Figure 13:
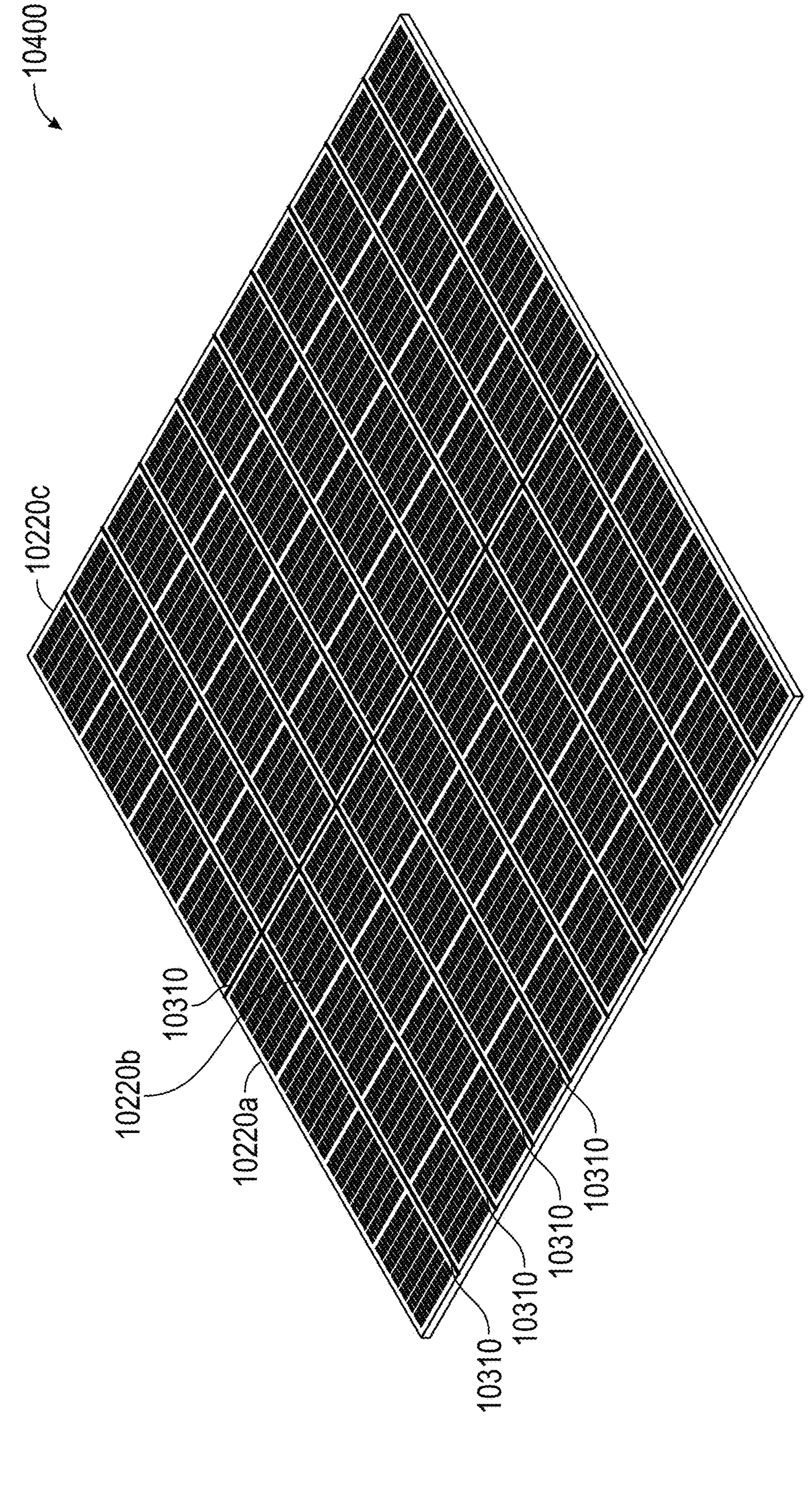
FIG. 13 illustrates multiple injection molded thermoplastic screen elements coupled together to each other to form a portion of a screen assembly.

The process of forming a screen assembly may continue by welding additional screen elements onto the first three screen elements shown in FIG. 12 to fabricate a larger screen assembly, like the screen assembly 10400 depicted in FIG. 13. In the embodiments depicted in FIGS. 12 and 13 each screen element includes four distinct screening "areas" separated by reinforcement regions. Thus, the screen assembly 10400 depicted in FIG. 13 is formed from 20 screen elements 10216 arranged in a 2 by 10 array. In alternate embodiments, the individual screen elements could have different dimensions and different configurations. Also, in alternate embodiments the number of screen elements that are joined together to form a screen assembly could vary depending on the desired overall dimensions of the screen assembly.

In the embodiments depicted in FIGS. 12 and 13, a plurality of screen elements 10216 that are the same size are joined together by welding or some other process to make a screen assembly. In alternate embodiments, the individual screen elements may have different sizes or shapes.

As discussed herein, individual screen elements may be of many different sizes, for example, 1"×1", 1"×6", 1"×5", 2"×5", 4"×5", etc. Regardless, a plurality of screen elements can be welded or joined together to make sub-assemblies, and multiple sub-assemblies can be joined together to make a larger screen assembly.

For example, FIG. 13 depicts a sub-assembly 10400 comprising twenty screen elements 10216. Multiple sub-assemblies 10400 can then be joined together using the same welding or joining techniques to make a screen assembly 10500 like the one depicted in FIG. 14. An advantage of fabricating sub-assemblies 10400 before fabricating a larger screen assembly is that many sub-assemblies 10400 can be fabricated in a variety of different sizes and shapes. Those different sized/shaped sub-assemblies may be stored in an easy to handle and store form factor. The sub-assemblies can then be quickly assembled into larger screen assemblies based on demand or other factors. Also, a variety of sized sub-assemblies make it possible to form larger screen assemblies in a variety of different sizes and shapes to satisfy custom requirements.

Figure 14:
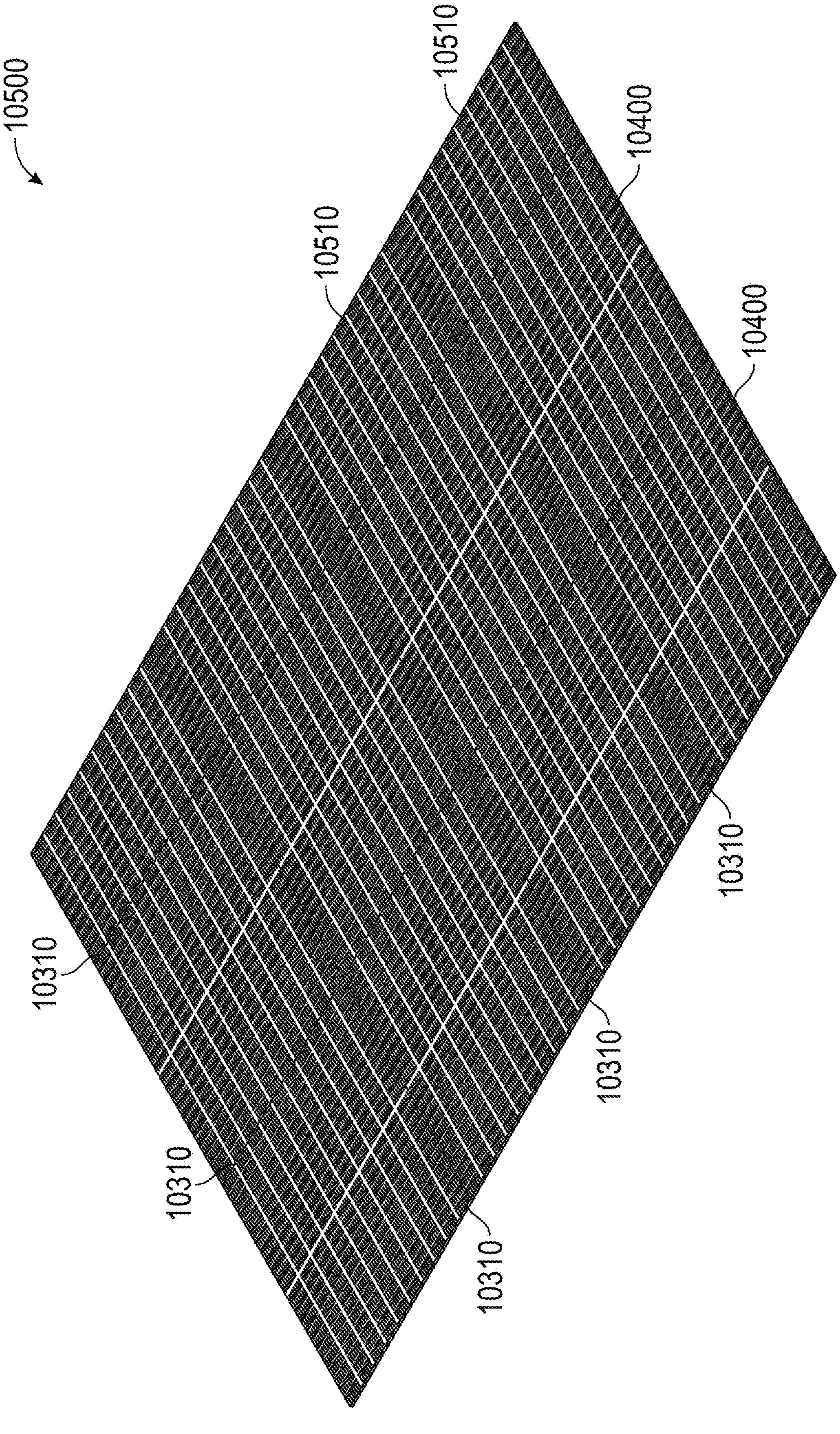
FIG. 14 illustrates a screen assembly formed by coupling together multiple injection molded thermoplastic screen elements.

FIG. 14 illustrates a thermoplastic screen assembly 10500 formed by joining together multiple sub-assemblies 10400. The thermoplastic screen assembly 10500 depicted in FIG. 14 is a 40"×30" thermoplastic screen assembly fabricated by joining eight 10"×10" thermoplastic sub-assemblies 10400 and four 10"×5" thermoplastic sub-assemblies 10510. The thermoplastic sub-assemblies 10400, 10510 may be joined together through any of the processes discussed herein with respect to FIGS. 12 and 14 along seams 10310.

Figure 15:
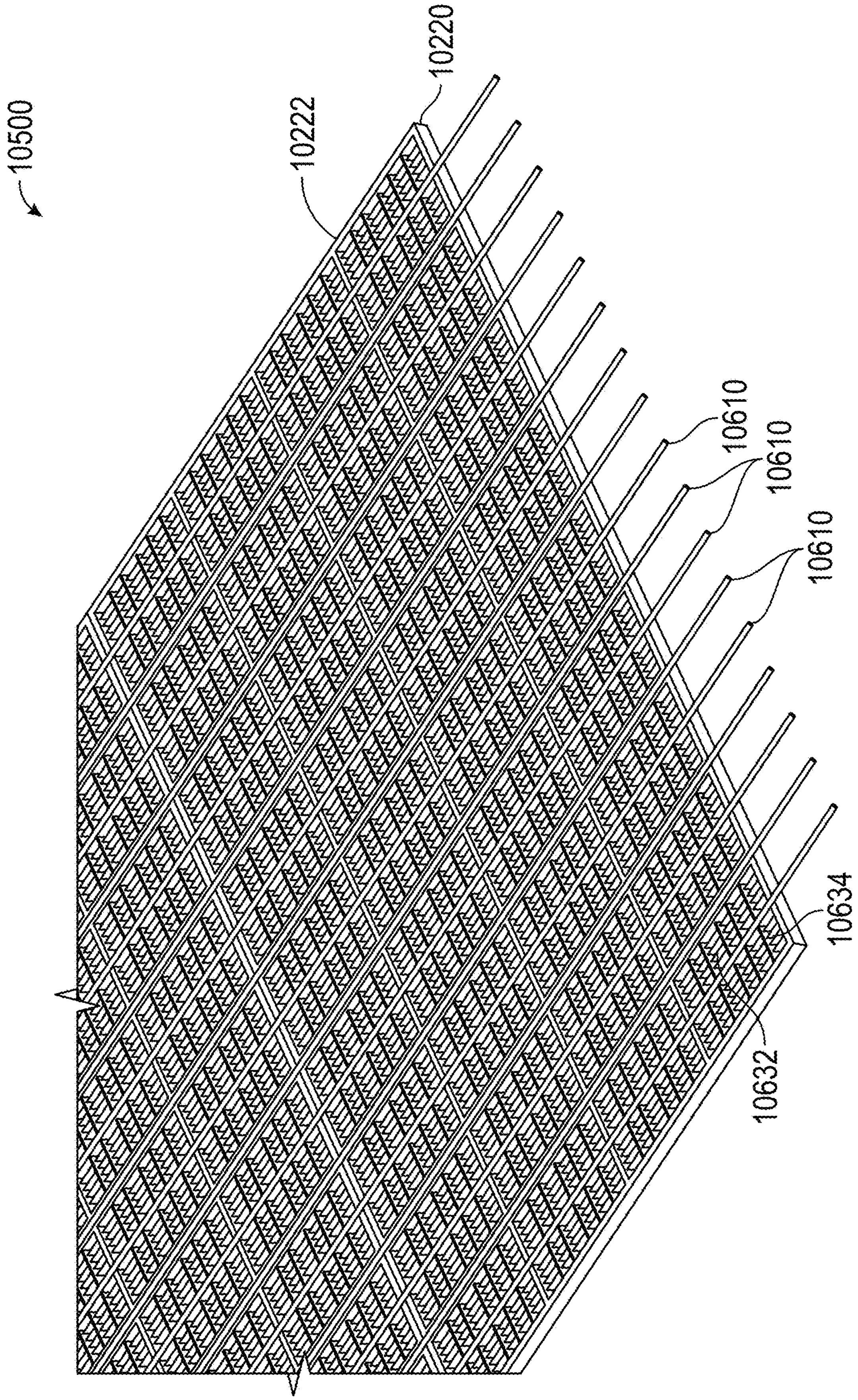
FIG. 15 illustrates a bottom perspective view of a screen assembly with reinforcement fibers embedded therein.
Figure 16:
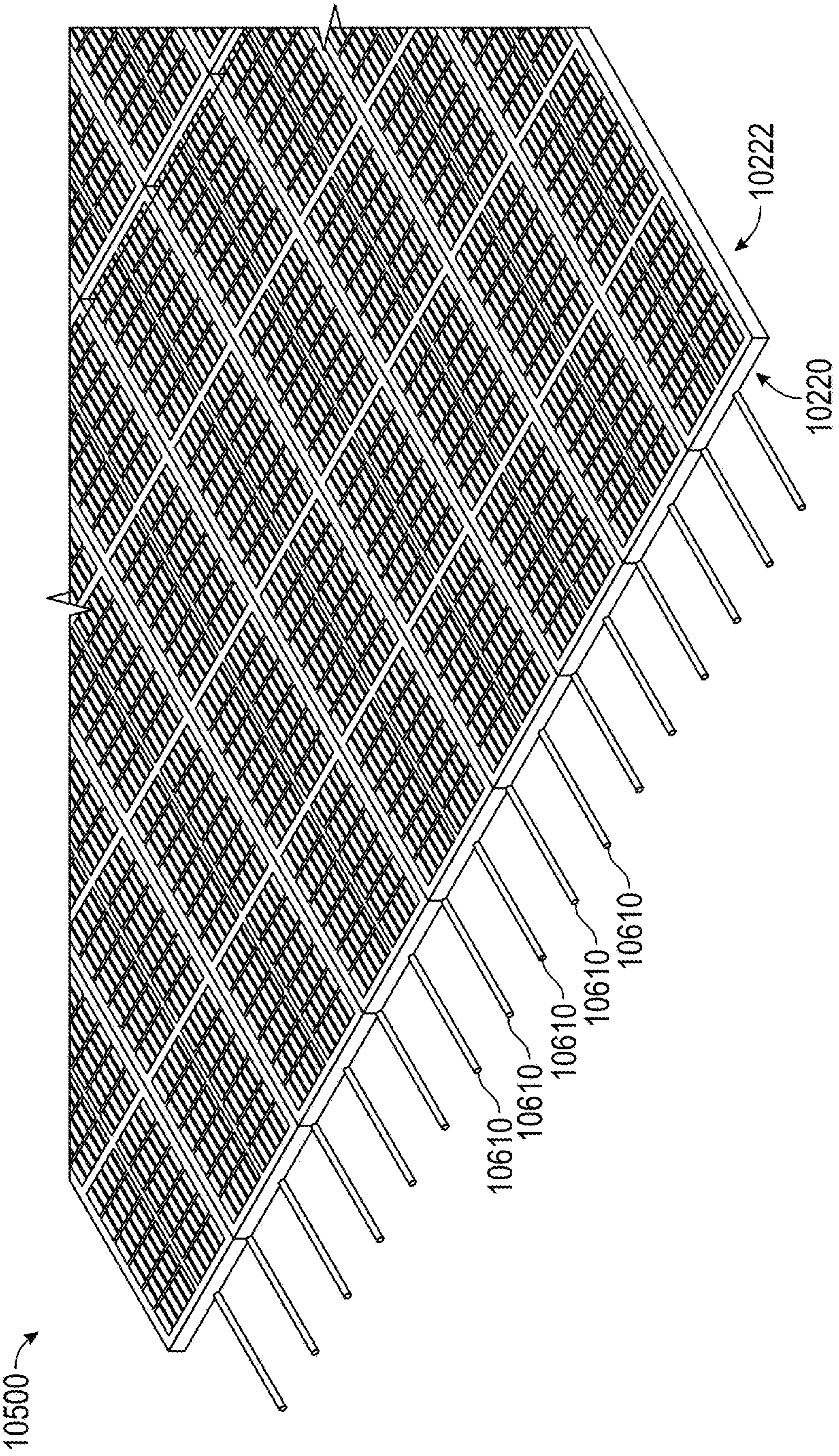
FIG. 16 illustrates a top perspective view of the screen assembly of FIG. 15.

After or while forming a thermoplastic screen assembly from a plurality of screen elements, one or more reinforcement fibers may be embedded into the screen assembly. FIGS. 15 and 16 illustrate bottom and top isometric views of a screen assembly 10500 with reinforcement fibers 10610 embedded therein. Reinforcement fibers 10610 are oriented within the screen assembly 10500 so that they extend in the direction in which the screen assembly will be tensioned. In the embodiment shown in FIGS. 15 and 16, the screen assembly 10500 will be tensioned from the ends 10220.

The reinforcement fibers 10610 may be sandwiched between two adjacent screen elements when the screen elements are joined together. Alternatively, or in addition, reinforcement fibers 10610 may be embedded into reinforcement members of the screen elements.

In the embodiment illustrated in FIG. 11A, the screen element 10216 includes three first reinforcement members 10230 that extend parallel to the end portions 10220 and between the side portions 10222. These first reinforcement members 10230 separate the four main screening sections of the screen element 10216. Smaller width second reinforcement members 10232 also extend parallel to the end portions 10220 and between the side portions 10222. These second reinforcement members 10232 extend between each row of screening openings. The screen element 10216 also includes third reinforcement members 10234 that extend parallel to the side portions 10222. Each of these third reinforcement members 10234 separate individual groups of the screening openings.

Reinforcement fibers 10610 can be embedded in the reinforcement members 10230, 10232, 10234 of the individual screen elements 10216 after multiple screen elements 10216 have been joined together to form a screen assembly 10500 like the one shown in FIGS. 15 and 16. The reinforcement fibers 10610 may be embedded into the respective reinforcement members in many ways.

In some embodiments, a reinforcement fiber 10610 may be embedded into the reinforcement members of the screen elements 10216 by localized heating of the reinforcement members to cause a portion of the reinforcement members to melt. The reinforcement fiber 10610 is then pressed into the melted portion of the reinforcement members. In some embodiments, a heating element such as a soldering iron may be used to press the reinforcement fiber 10610 into the reinforcement members as the soldering iron melts the material of the reinforcement members. In some embodiments, an elongated heating element that extends all or a portion of the length of the screen assembly 10500 may be brought adjacent to or in contact with a set of adjoining reinforcement members of multiple screen elements. The heating element then simultaneously melts the material of multiple ones of the reinforcement members. After the reinforcement members are melted, a reinforcement fiber is pressed into the melted material to embed the reinforcement fiber into the material of the reinforcement members. In some embodiments, the reinforcement fiber 10610 may be placed along an edge of such an elongated heating element. Then, the elongated heating element may press a length of reinforcement fiber 10610 into the reinforcement members as the heating element melts the reinforcement members.

Other methods may be used to melt the thermoplastic of the screen elements in order to embed a reinforcement fiber 10610 in the material of the screen elements. For example, laser or light radiation may be used to cause localized melting of the material of the screen elements so that a reinforcement fiber 10610 can be embedded therein. In some embodiments, hot air also may be used to melt the material of the screen elements.

In some embodiments, such as when the melting point of the reinforcement fiber is greater than the melting point of the thermoplastic material in which it is embedded, the reinforcement fibers themselves may be heated above the melting point of the thermoplastic material of the reinforcement members. The heat of the fiber can then be used to melt the thermoplastic material as the heated fiber is pressed into the reinforcement members of the screen elements, or perhaps into a seam joining two or more screen elements.

In some embodiments, the reinforcement fiber is an aramid fiber, such as Kevlar. In some embodiments, metal strands are intertwined with the aramid fiber to form the reinforcement fiber. In some embodiments, the reinforcement fiber is stainless steel or other metal in either a solid core or stranded form. In some embodiments, the reinforcement fiber is a metal rod. In some embodiments, the reinforcement fiber is a yarn.

In some embodiments, embedding the reinforcement fibers into the thermoplastic material of the screen elements may involve only pressing the reinforcement fiber into a top or bottom surface of the screen elements, such as along a reinforcement member, so that the reinforcement fiber is only partially encapsulated in the thermoplastic material of the screen elements. In other embodiments, the reinforcement fibers are fully encapsulated in the thermoplastic material of the screen elements.

Embedding the reinforcement fibers 10610 into the material of the reinforcement members of the screen elements can prevent the reinforcement fibers 10610 from blocking any of the screening openings of the screen elements. Also, fully embedding the reinforcement fibers 10610 into the material of the screen elements or the screening assembly prevents the reinforcement fibers from being brought into contact with the material being screened by the screen assembly or the portions of the screening machine upon which the screen is mounted. Contact between the material to be screened or the screening machine and the reinforcement fibers 10610 tends to wear away and damage the reinforcement fibers 10610, particularly because the screen assemblies are being vibrated with respect to the material to be screened. Thus, it is desirable to fully embed the reinforcement fibers in the material of the screening assembly, where possible.

If it is not possible to fully embed the reinforcement fibers into the material of the screen elements, then it is preferable to partially embed the reinforcement fibers into the bottom surface of the screen assembly. If portions of the reinforcement fibers are exposed on the top surface of the screen assembly, the reinforcement fibers will be exposed to the material being screened while the screens are being vibrated. The relative motion between the screen assembly and the exposed portions of the reinforcement fibers and the material being screened will tend to wear away and/or damage the reinforcement fibers. On the other hand, if the exposed portions of the reinforcement fibers are located on the bottom surface of the screen assembly, far less damage occurs to the reinforcement fibers during use.

In some embodiments, the screen elements may be molded to include one or more grooves that are configured to receive one or more reinforcement fibers. In some embodiments, side grooves are molded into the bottom surfaces of the side edges. In other embodiments, a central groove could be molded into the bottom surface of a central reinforcement member that runs up the center of the length of the screen element. In some embodiments, end grooves may be molded into the bottom surfaces of the ends of the screen element. Of course, in any particular embodiment, only one of these types of grooves may be provided in the screen element.

When grooves are molded into a bottom surface of the screen elements, they facilitate embedding reinforcement fibers into the material of a screen assembly. Once the screen assembly has been formed by attaching multiple screen elements together, the grooves of the screen elements will align across the length and/or width of the screen assembly. Reinforcement fibers can then be laid into the aligned grooves and heat can be selectively applied to partially melt the material of the screen elements in and around the grooves to cause the reinforcement fibers to become embedded into the material.

In some instances, the reinforcement fibers will become fully embedded in the material of the screen elements. In other instances, the fibers will be partially embedded into the material of the screen elements, but the exposed portions of the reinforcement fibers will be located on the bottom surface of the screen assembly where damage is less likely to occur. The material being screened will fall down through the screening openings of the screen elements. Because any exposed portions of the reinforcement fibers will be located on the bottom surfaces of the sides or ends of the screen elements, or on the bottom surface of a reinforcement member, the exposed portions of the reinforcement fibers will be effectively shielded from the material being screened. Thus, any wear of damage to the exposed portions of the reinforcement fibers is minimized.

Figure 17A:
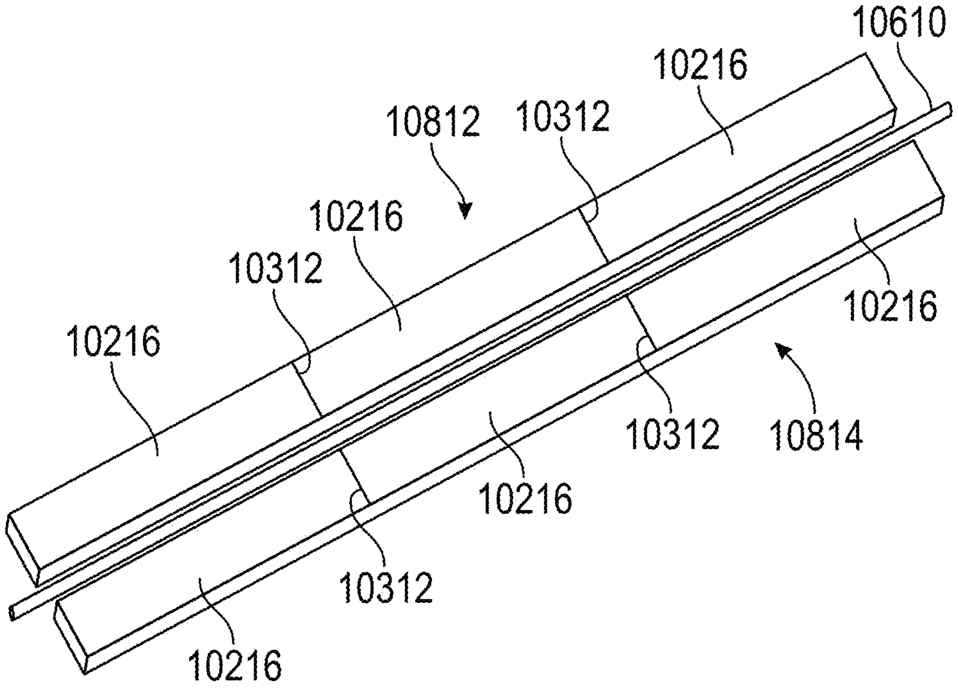
FIG. 17A is a perspective view showing how two strips of joined screen elements can be joined together with a reinforcement fiber sandwiched between the strips of screen elements.
Figure 17B:
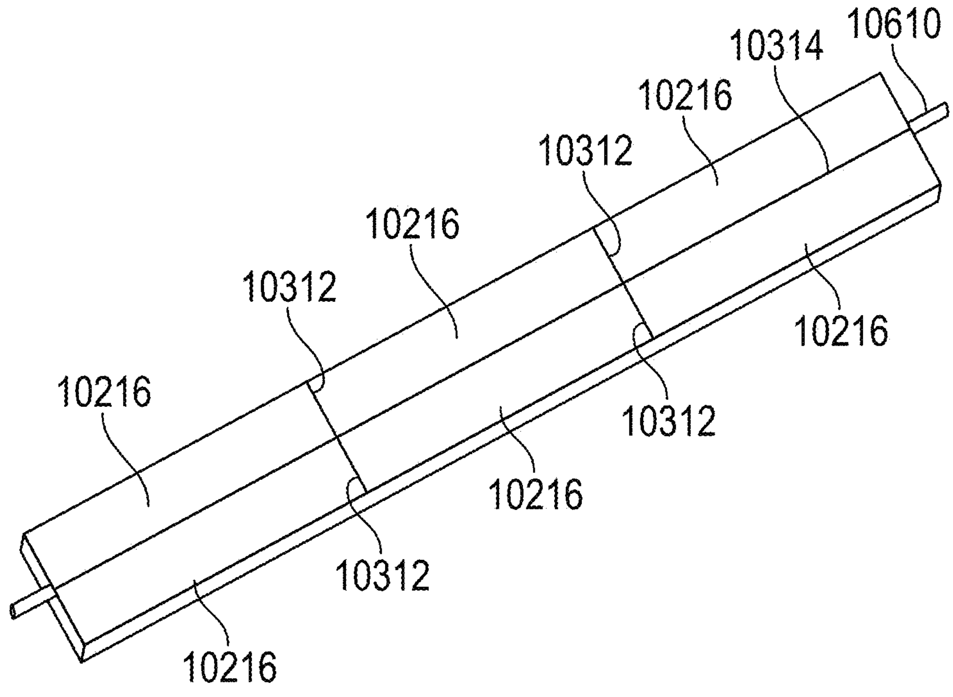
FIG. 17B illustrates the two strips of screen elements of FIG. 17A after the strips of screen elements have been joined together.

As mentioned above, reinforcement fibers 10610 could also be located between adjacent edges of the screen elements as the screen elements are joined together to form a screen assembly or sub-assembly. FIG. 17A illustrates two strips 10812, 10814 of screen elements 10216 that have been joined together, end-to-end along first seams 10312. One can join the two strips 10812, 10814 of screen elements together by melting the adjacent side edges, bringing the two strips 10812, 10814 of screen element together and allowing the material of the screen elements to cool to form a structure as illustrated in FIG. 17B. The side edges of the strips 10812, 10814 of screen elements are joined along a second seam 10314 that extends the length of the structure.

As illustrated in FIG. 17A, just before the two strips 10812, 10814 of screen element are joined together, a reinforcement fiber 10610 can be positioned between the side edges of the screen elements 10216 of each strip 10812, 10814 of screen elements. Once the two strips 10812, 10814 of screen elements are brought together and the material is allowed to cool, the reinforcement fiber 10610 will be embedded in the structure along the lengthwise seam 10314. Ideally, the reinforcement fiber 10610 is positioned between the top and bottom surfaces of the screen elements 10216 so that no portion of the reinforcement fiber is exposed.

The number of reinforcement members that are embedded in a screen assembly is selected to provide the screen assembly with sufficient tensile strength to withstand the tensioning forces that are applied to the screen assembly to mount and hold the screen assembly on the screening machine during screening operations. Because the screen assembly can be subjected to significant acceleration and vibratory forces, the tension used to hold the screen assembly on the screening machine can be significant. If a screen assembly is constructed as described above in connection with FIGS. 17A and 17B, where a reinforcement fiber 10610 is sandwiched between the side edges of long strips of screen elements, the number of reinforcement fibers that can be embedded in the screen assembly is limited by the number of seams 10314 between adjacent strips of screen elements. In some instances, that may result in the screen assembly not having a sufficient number of reinforcement fibers to comfortably withstand the tensioning forces that are applied to hold the screen assembly on the screening machine. If that is the case, it would be desirable to also embed additional reinforcement fibers into portions of the screening assembly located between the lengthwise seams 10314 that exist where side edges of the strips of screen elements are joined together.

As mentioned above, a screen assembly formed as discussed above, where side edges of the screen elements are joined together, would then be attached to first and second side edges that include mounting apertures as also described above. Examples of this are depicted in FIGS. 6, 7A-7C and 10A-10D.

Conditional language, such as, among others, “can,” “could,” “might,” or “may,” unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

This specification and annexed drawings disclose vibratory screening machines that include stacked screening deck assemblies. It is, of course, not possible to describe every conceivable combination of elements for purposes of describing the various aspects of the disclosure. Thus, while embodiments of this disclosure are described with reference to various implementations and exploitations, it is noted that such embodiments are illustrative and that the scope of the disclosure is not limited to them. Those of ordinary skill in the art can recognize that many further combinations and permutations of the disclosed features are possible. As such, various modifications can be made to the disclosure without departing from the scope or spirit thereof. In addition or in the alternative, other embodiments of the disclosure can be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A screen assembly configured to be mounted to a screening machine, comprising:

a screening portion that includes a plurality of screening openings that extend between a top surface and a bottom surface of the screening portion;

front and rear edges located on front and rear sides, respectively, of the screening portion, wherein a front hook is provided on the front edge and a rear hook is provided on the rear edge. the front and rear hooks being configured to receive tensioning forces that secure the screen assembly to a screening machine;

first and second side edges located on first and second sides, respectively, of the screening portion, wherein each of the first and second side edges comprise:

an upwardly extending portion that projects upward from the top surface of the screening portion; and a first mounting recess that opens to a bottom surface of the side edge of the screen assembly such that a projection on a screening machine can be received in the first mounting recess when the screen assembly is mounted on the screening machine, wherein a top portion of the first mounting recess extends above the top surface of the screening portion.

2. The screen assembly of claim 1, wherein a length of the first mounting recess on each of the first and second side edges extends along the first and second side edges from a location adjacent the front edge to a location adjacent the rear edge.

3. The screen assembly of claim 1, wherein the first mounting recess on each of the first and second side edges has a width that narrows from a bottom portion of first mounting recess to the top portion of the first mounting recess.

4. The screen assembly of claim 1, wherein each of the first and second side edges further comprises a second mounting recess that opens to the bottom surface of the side edge.

5. The screen assembly of claim 4, wherein a top portion of the second mounting recess on each of the first and second side edges is located below a top portion of the first mounting recess.

6. The screen assembly of claim 1, wherein the material of the first and second side edges is configured such that when the screen assembly is not mounted to a screen deck, the upwardly extending portion of each of the first and second side edges extends sideways and outward away from the side edge.

7. The screen assembly of claim 6, wherein a thickness of the upwardly extending portions of each of the first and second side edges narrows from a lower part of the upwardly extending portion to an upper part of the upwardly extending portion.

8. The screen assembly of claim 1, wherein each of the first and second side edges further comprises an inwardly extending depression on an outer side surface of the side edge.

9. The screen assembly of claim 1, wherein each of the first and second side edges includes a foot that is located on a lower portion of an outer side of the side edge.

10. The screen assembly of claim 9, wherein each of the first and second side edges further comprises an inwardly extending depression on the outer side of the side edge, the inwardly extending depression being located between the foot and the upwardly extending portion.

11. The screen assembly of claim 9, wherein the foot on each of the first and second side edges comprises a plurality of slits, cuts or apertures that open to a bottom surface of the foot and that extend across a width of the foot.

12. The screen assembly of claim 11, wherein the plurality of slits, cuts or apertures of the foot extend upward from the bottom surface of the foot to a height that is only part of a total height of the foot.

13. The screen assembly of claim 1, wherein inner surfaces of the first mounting recess on each of the first and second side edges are bstantially straight such that the first mounting recess is triangular shaped.

14. The screen assembly of claim 1, wherein an inner surface of the first mounting recess on each of the first and second side edges is curved.

15. The screen assembly of claim 1, wherein the screening portion is formed from a plurality of screen elements that are attached to each other, edge-to-edge, and wherein the first and second side edges are joined to outer edges of the screen elements that are located along the first and second sides of the screening portion.

16. The screen assembly of claim 15, wherein the material of the first and second side edges is fused to the material of the screen elements that are located along the first and second sides of the screening portion.

17. The screen assembly of claim 15, wherein the material of the first and second sides is attached to the screen elements that are located along the first and second sides of the screening portion via an adhesive.

18. The screen assembly of claim 1, wherein the first mounting recess of each of the first and second side edges comprises an elongated mounting recess that is configured to receive an elongated projection on the screening machine when the screen assembly is mounted on the screening machine.

19. A screen assembly configured to be mounted to a screening machine, comprising:

a screening area having screening openings surrounded by a front edge, a rear edge and first and second sides; and first and second side edges that are located on the first and second sides, respectively, of the screening area, wherein each of the first and second side edges comprises:

a main body;

an upwardly extending tip located above the main body that extends above a top surface of the screening area, wherein the material of the upwardly extending tip is configured such that when the screen assembly is not mounted on a screen deck, a top portion of the upwardly extending tip will extend outwards away from an outer side of the main body and such that when screen assembly is mounted on a screening machine, the top portion of the upwardly extending tip will press against and form a seal against an inner surface of a side rail of the screening machine; and a foot that is located on a lower, outer portion of the side edge, wherein the foot comprises a plurality of slits, cuts or apertures that open to a bottom surface of the foot and that extend at least partially across a width of the foot.

20. The screen assembly of claim 19, wherein each of the first and second side edges further comprises an inwardly extending depression on the outer side of the side edge, the inwardly extending depression being located between the foot and the upwardly extending tip.

21. The screen assembly of claim 19, wherein the plurality of slits, cuts or apertures of the foot extend upward from the bottom surface of the foot to a height that is only part of the total height of the foot.

22. The screen assembly of claim 19, wherein each of the first and second side edges further comprises a first mounting recess that opens to a bottom surface of the side edge of the screen assembly such that a projection on a screening machine can be received in the first mounting recess when the screen assembly is mounted on the screening machine, wherein a top portion of the first mounting recess extends above a top surface of the screening area.

23. The screen assembly of claim 22, wherein the first mounting recess on each of the first and second side edges has a width that narrows from a bottom portion of first mounting recess to the top portion of the first mounting recess.

24. The screen assembly of claim 19, wherein the screening area is formed from a plurality of screen elements that are attached to each other, edge-to-edge, and wherein the first and second side edges are separate elements that are attached to outer edges of screen elements located along the first and second sides of the screening area.

25. The screen assembly of claim 24, wherein the material of the first and second side edges is fused to the material of the screen elements located along the first and second sides of the screening portion.

26. A screen assembly configured to be mounted to a screening machine, comprising:

a screening portion that includes a plurality of screening openings that extend between a top surface and a bottom surface of the screening portion, wherein the screening portion is formed from a plurality of screen elements, where side edges of the screen elements are attached directly to each other to form the screening portion;

front and rear edges located on front and rear sides, respectively, of the screening portion, wherein a front book is provided on the front edge and a rear hook is provided on the rear edge, the front and rear hooks being configured to receive tensioning forces that secure the screen assembly to a screening machine;

first and second side edges located on first and second sides, respectively, of the screening portion, wherein each of the first and second side edges comprise:

an upwardly extending portion that projects upward from the top surface of the screening portion;

a mounting surface that is configured to bear against a side mounting member of a screening machine when the screen assembly is secured to the screening machine, wherein a top portion of the mounting surface extends above the top surface of the screening portion; and a first mounting recess that opens to a bottom surface of the side edge such that a projection on a screening machine can be received in the first mounting recess when the screen assembly is mounted on the screening machine, wherein a top portion of the first mounting recess extends above a top surface of the screening area;

wherein the first and second side edges are joined to the material of the outer edges of the screen elements that are located along the first and second sides of the screening portion.

27. The screen assembly of claim 26, wherein the mounting surface of each of the first and second side edges is located on an outer side of the side edge.

28. The screen assembly of claim 26, wherein the material of the first and second side edges is configured such that when the screen assembly is not mounted to a screen deck, the upwardly extending portion of each of the first and second side edges extends sideways and outward away from the side edge.

29. The screen assembly of claim 26, wherein the mounting surface is flat.

30. The screen assembly of claim 26, wherein the mounting surface is curved.

31. The screen assembly of claim 26, wherein the first mounting recess of each of the first and second side edges comprises an elongated mounting recess that is configured to receive an elongated projection on the screening machine when the screen assembly is mounted on the screening machine.

* * * * *